United States Patent
Malone

(10) Patent No.: US 12,147,536 B1
(45) Date of Patent: Nov. 19, 2024

(54) EXPLOIT DETECTION TOOLS FOR CHIPSETS

(71) Applicant: Specialized Security Services LLC, Norman, OK (US)

(72) Inventor: Nicholas Duncan Malone, Carmel, CA (US)

(73) Assignee: Specialized Security Services LLC, Norman, OK (US)

(*) Notice: Subject to any disclaimer, the term of this patent is extended or adjusted under 35 U.S.C. 154(b) by 264 days.

(21) Appl. No.: 17/875,070

(22) Filed: Jul. 27, 2022

(51) Int. Cl.
*G06F 21/00* (2013.01)
*G06F 21/54* (2013.01)
*G06F 21/55* (2013.01)

(52) U.S. Cl.
CPC .......... *G06F 21/556* (2013.01); *G06F 21/54* (2013.01); *G06F 21/554* (2013.01)

(58) Field of Classification Search
CPC ....... G06F 21/556; G06F 21/54; G06F 21/554
See application file for complete search history.

(56) References Cited

U.S. PATENT DOCUMENTS

| | | | |
|---|---|---|---|
| 2016/0094571 A1* | 3/2016 | Sahita | G06F 12/1458 726/23 |
| 2018/0046803 A1* | 2/2018 | Li | G06F 11/302 |
| 2020/0372129 A1* | 11/2020 | Gupta | G06F 9/3842 |
| 2022/0129551 A1* | 4/2022 | Collier | G06F 21/565 |

\* cited by examiner

*Primary Examiner* — Tri M Tran
(74) *Attorney, Agent, or Firm* — Maiorana Patent Law, PA

(57) ABSTRACT

A method for detecting an exploit in a processing instruction. The method may comprise steps of receiving processor instructions, analyzing the processor instructions to detect data flow instructions, trimming out the data flow instructions, comparing the data flow instructions to a pre-defined pattern for exploit behavior, and generating an exploit notification in response to detecting the pre-defined pattern for exploit behavior in the data flow instructions.

20 Claims, 11 Drawing Sheets

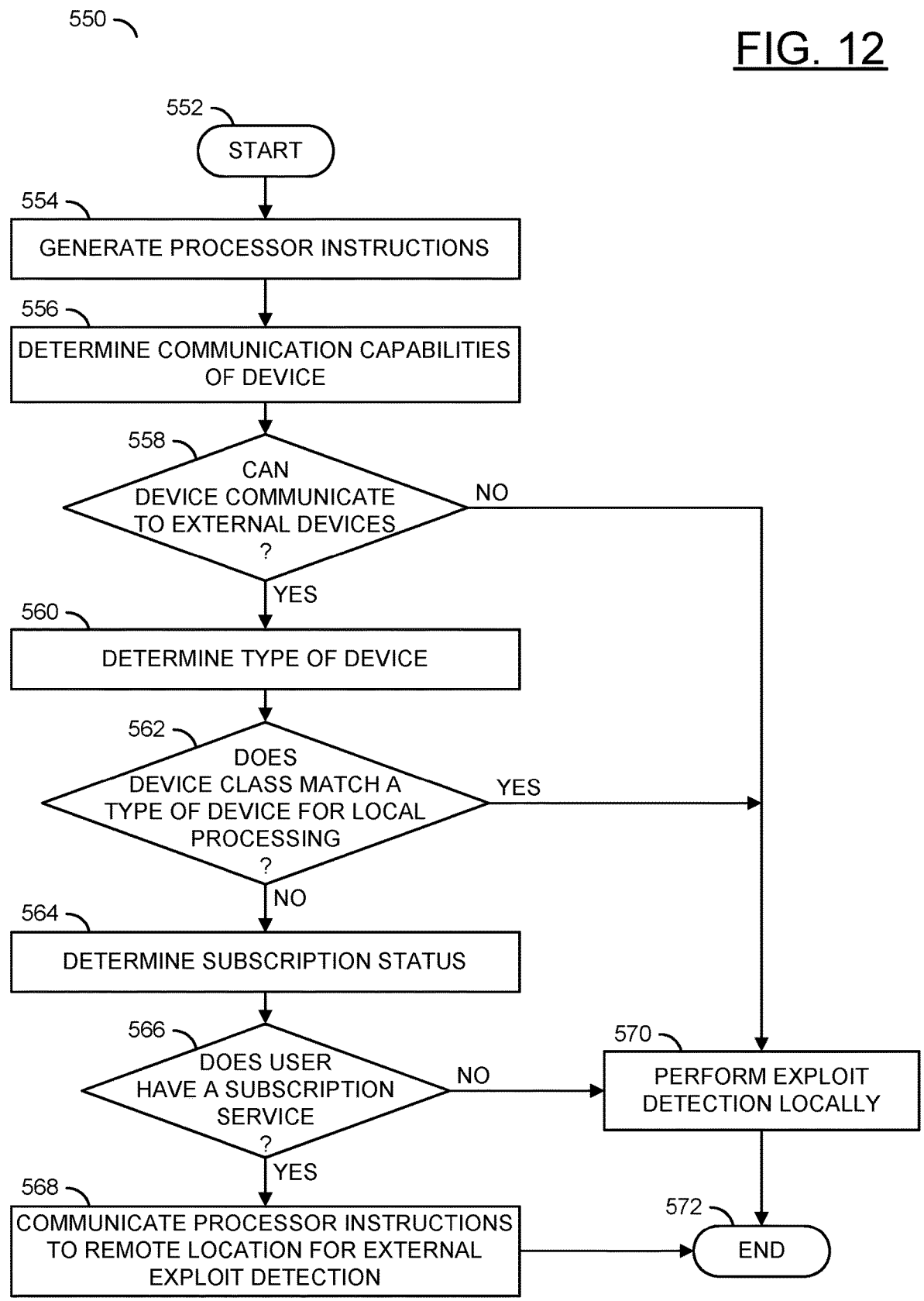

EXPLOIT DETECTION TOOLS FOR CHIPSETS

FIELD OF THE INVENTION

The invention relates to computer security generally and, more particularly, to a method and/or apparatus for implementing exploit detection tools for chipsets.

BACKGROUND

As computing devices are increasingly used in all aspects of daily life, from recreation to mission-critical scenarios, computer security is essential. Computing hacking and using security exploits is a lucrative activity. Even when money is not at stake, security exploits can result in inconvenience. Causing havoc is a past-time from various bad faith actors (i.e., trolls, script-kiddies, state-sponsored cyberattackers, etc.). There is a continual race between newly discovered exploits, and attempts to patch the exploits. Even when exploits are patched, security concerns can be ignored by end-users and IT departments are often an afterthought for businesses.

Conventional computer security software (i.e., antivirus software, anti-malware software, etc.) often relies on detecting known files or signatures from a database, or heuristics based on similarities to known exploits. Security software is generally run at the operating system level. Files or other objects are scanned and compared to previously known exploits. While conventional security software is useful, many security exploits are being discovered at the hardware level. Computer security software runs at the operating system level and is not available until the computer has loaded the operating system.

It would be desirable to implement exploit detection tools for chipsets

SUMMARY

The invention concerns a method for detecting an exploit in a processing instruction. The method may comprise steps of receiving processor instructions, analyzing the processor instructions to detect data flow instructions, trimming out the data flow instructions, comparing the data flow instructions to a pre-defined pattern for exploit behavior, and generating an exploit notification in response to detecting the pre-defined pattern for exploit behavior in the data flow instructions.

BRIEF DESCRIPTION OF THE FIGURES

Embodiments of the invention will be apparent from the following detailed description and the appended claims and drawings.

FIG. 12 is a flow diagram illustrating a method for selecting local or remote analysis of processor instructions.

DETAILED DESCRIPTION OF THE EMBODIMENTS

Figure 1:
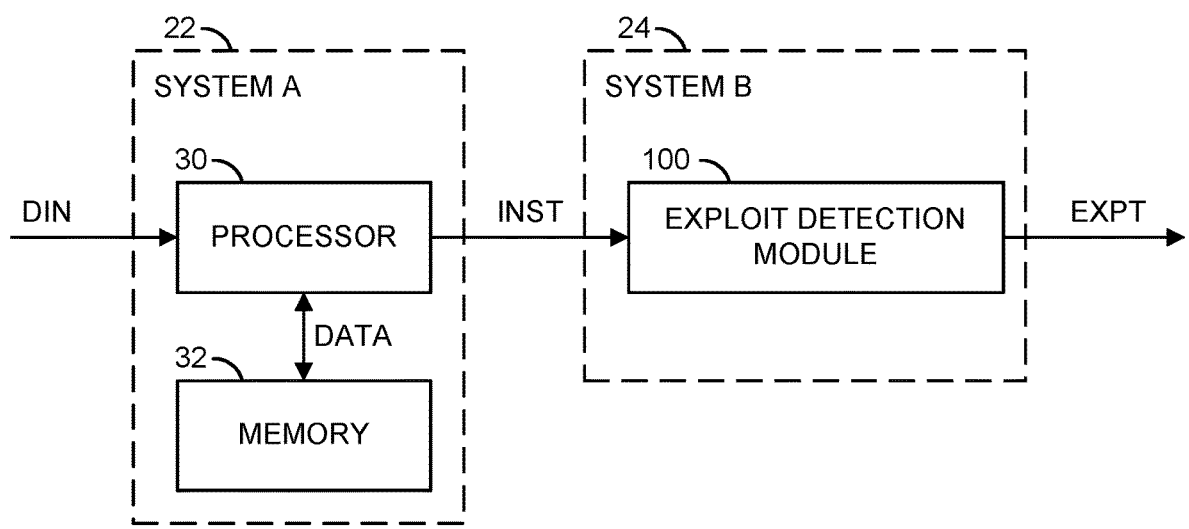
FIG. 1 is a block diagram illustrating an example embodiment of the present invention.

Embodiments of the present invention include providing exploit detection tools for chipsets that may (i) trim processing instructions down to data flow instructions, (ii) scan data flow instructions for specific instructions, (iii) track physical memory locations, (iv) be implemented locally on a processor, (v) detect exploits in processing instructions sent from a remote location, (vi) detect exploits at all levels of processor instructions, (vii) detect exploits before an operating system has loaded, (viii) implement a rolling buffer and/or (ix) be implemented as one or more integrated circuits.

Embodiments of the present invention may be configured to detect computer security exploits. The security exploits may be detected in processor instructions. Detecting the exploits in the processor instructions may enable detection of the exploits at all levels of operation of a computer. A processor, memory, cache and/or registers may be configured to detect the security exploits by analyzing activity of a processor. The activity of the processor may be analyzed via tracing, cache and buffer monitoring and/or by adding features to the processor.

Embodiments of the present invention may be configured to reduce (e.g., trim) the processor data down to specific elements. The specific elements may comprise particular instructions and the memory locations associated with the instructions. The instructions and memory locations may be tracked in order to identify exploit behavior. An alert may be generated in response to detecting that the tracked data matches the exploit behavior.

The exploit behavior may be detected in response to analyzing a creation of new branches of execution occurring at the processor level. For example, in each processor instruction set there may be specific codes that occur when the processor changes an execution flow. The existing execution flow may be interrupted and new data and branches may be added. Particular patterns of how data branches are created and/or returned to may be indicative of the exploit behavior.

Embodiments of the present invention may be a diagnostic tool. The diagnostic tool may be used in association with various types of processors (e.g., Intel, AMD, ARM, etc.). An exploit may make instruction changes. Generally, for particular types of processors (such as ARM and AMD), only a few instructions may be changed when there is a change in execution flow. The diagnostic tool may check for an exploit by determining if the change in execution flow follows the known pattern for a legitimate execution flow change or if the change in execution flow follows the pattern of an exploit. In an example, if the diagnostic tool is implemented in a vehicle, the diagnostic tool may detect the hack to the vehicle (or a component of the vehicle) and prevent the exploit.

Embodiments of the present invention may be configured to detect the exploit in response to enabling processor debug functions of a processor, sending the processor instruction stream to an external location, trimming the data down to the data flow instructions, and then streaming the data flow instructions through an exploit detection module. In some embodiments of the present invention, the exploit may be detected in response to reading out a processor instruction buffer of the processor, sending the processor instruction stream to an external location, trimming the data down to the data flow instructions, and then streaming the data flow instructions through the exploit detection module.

In some embodiments of the present invention, the exploit may be detected in response to enabling trace functions of the processor, sending the processor instruction stream to the external location, trimming the data down to the data flow instructions, and then streaming the data flow instructions through the exploit detection module. In some embodiments of the present invention, the exploit may be detected in response to enabling the processor debug functions of the processor, writing the data to a processor buffer, trimming the data down to the data flow instructions, and then applying the exploit detection techniques to the data flow instructions in the processor buffer. In some embodiments of the present invention, the exploit may be detected in response to reading out the processor instruction buffer of the processor, writing the data to the processor buffer, trimming the data down to the data flow instructions, and then applying the exploit detection techniques to the data flow instructions in the processor buffer.

In some embodiments of the present invention, the exploit may be detected in response to enabling trace functions of the processor, writing the data to the processor buffer, trimming the data down to the data flow instructions, and then applying the exploit detection techniques to the data flow instructions in the processor buffer. In some embodiments of the present invention, for systems that implement an operating system, the processor data stream may be sent to the operating system and streamed through the present invention to detect the exploit. In some embodiments of the present invention, if the processor data has been saved, the processor data may be processed by an embodiment of the present invention at a later time/date in order to detect the exploit. The method of processing the data and/or storing the data may be varied according to the design criteria of a particular implementation.

Embodiments of the present invention may be configured to detect speculative execution exploits. In some embodiments, exploits at the random-access memory level may be detected. In some embodiments, exploits that occur in the operating system, applications, virtual machines, containers and/or other components that use the processor may be detected. Exploits may be detected outside of an operating system environment. Embodiments of the present invention may be configured to detect anything that causes the processor to change the flow of execution at the processor level. Generally, any type of exploit that changes what happens next may affect the data flow at the processor level, regardless of how or what is enabling the exploit. For example, the exploits may be detected in an encrypted virtual machine and/or in a fully secured docker container. In an example, the exploits may comprise application exploits, container exploits, real time operating system exploits, virtualized system exploits, code exploits, cloud platform exploits, firmware exploits, software exploits, etc. The types of exploits detected may be varied according to the design criteria of a particular implementation.

The exploit detection may be configured to be executed in any context as long as the processor data is available. Embodiment of the present invention may be configured to function without external dependencies in order to run and detect evidence of exploits in the processor data. Generally, exploit detection may be more effective the sooner that the diagnostic tool receives the processor data (e.g., if the exploit is executed before the data is and through collected passed the diagnostic tool, then identification may not occur). In some embodiments, the exploit detection may be configured to run in the BIOS and/or UEFI in order to detect exploits that may be implemented at the BIOS and/or UEFI level.

Embodiments of the present invention may be implemented in computing systems used by manufactures, large-scale (e.g., bulk) purchasers of computing devices, governments, businesses with data to protect, limited vehicle manufactures, security product vendors, IT and security teams, cloud providers, etc. In one example, embodiments of the present invention may be implemented as part of a security suite. In embodiments, where the exploit detection is implemented locally, the exploit detection may be performed in real-time (e.g., provide real time protection). In embodiments, where the exploit detection is implemented remotely, the exploit detection may be delayed (e.g., 1 to 3 minutes while the data is streamed to the remote location, and then the potential alert is streamed back).

Referring to FIG. 1, a block diagram illustrating an example embodiment of the present invention is shown. A system 20 is shown. The system 20 may comprise a block (or circuit) 22 and/or a block (or circuit) 24. The block 20 may implement a system. The block 24 may implement a system. The system 22 and/or the system 24 may be any type of device that implements a processor. For example, the system 22 and/or the system 24 may be a container server, a router, a desktop computer, a car, a plane, etc. The system 20 may comprise other components (not shown). For example, various circuitry and/or infrastructure may provide an interconnection between the system 22 and the system 24. In some embodiments, the system 22 and the system 24 may be separate devices (e.g., devices implemented at separate locations, two discrete units, etc.). In some embodiments, the system 22 and the system 24 may be components of a single device. The arrangement and/or type of the system 22 and/or the system 24 may be varied according to the design criteria of a particular implementation.

The system 22 may receive a signal (e.g., DIN) and generate a signal (e.g., INST). The system 24 may receive the signal INST and generate a signal (e.g., EXPT). The signal DIN may comprise an input (e.g., data). The signal INST may comprise processor instructions. The signal EXPT may comprise an alert. The system 22 and/or the system 24 may send/receive other signals (not shown). The number, type and/or data communicated in the signals to/from the system 22 and/or the system 24 may be varied according to the design criteria of a particular implementation.

The system 22 may comprise a block (or circuit) 30 and/or a block (or circuit) 32. The circuit 30 may implement a processor. The circuit 32 may implement a memory. The system 24 may comprise an apparatus (or block or circuit) 100. The apparatus 100 may implement an exploit detection module. The system 22 and/or the system 24 may comprise other components (not shown). The number, type and/or arrangement of the components of the system 22 and/or the system 24 may be varied according to the design criteria of a particular implementation.

The processor 30 may be configured to execute computer readable instructions. In one example, the computer readable instructions may be stored in the memory 32 and presented to the processor 30. In another example, the computer readable instructions may be received from an external source. The processor 30 may be configured to perform various operations and/or make decisions in response to the computer readable instructions. In an example, the computer readable instructions may be executed by the processor 30 in order to perform various steps that enable a software application to be run by the system 22.

The computer readable instructions may be implemented in various computer code languages (e.g., C, C++, Python, COBOL, Rust, etc.). The processor 30 may be configured to compile the computer readable instructions in order to generate machine code. The machine code may be generated to be compatible with a particular architecture of the processor 30. In one example, the processor 30 may implement a 32-bit architecture. In another example, the processor 30 may implement a 64-bit architecture. In yet another example, the processor 30 may implement an Intel architecture. In still another example, the processor 30 may implement an AMD architecture. In another example, the processor 30 may implement an ARM architecture. In yet another example, the processor 30 may implement a RISC-V architecture. In still another example, the processor 30 may implement a SPARC architecture. The type of computer code implemented and/or the architecture implemented by the processor 30 that executes the computer code may be varied according to the design criteria of a particular implementation.

The memory 32 may be configured to store computer readable data. The memory 32 may be configured to send/receive a signal (e.g., DATA). The signal DATA may comprise data communication between the processor 30 and the memory 32. In one example, the memory 32 may comprise an internal storage medium for the system 22 (e.g., a random-access memory, a cache, an internal hard drive, a solid state drive, etc.). In another example, the memory 32 may comprise a removable storage medium for the system 22 (e.g., a disk drive, a USB flash drive, an external hard drive, etc.). In some embodiments, the memory 32 may implement a volatile memory. In some embodiments, the memory 32 may implement a non-volatile memory. The memory 32 may comprise a number of physical locations configured to store various commands of the computer readable instructions. The type of data stored by the memory 32, the type of the memory 32 and/or a capacity of the memory 32 may be varied according to the design criteria of a particular implementation.

The processor 30 may receive the signal DIN and/or the signal DATA. The signal DIN may comprise data input. In some embodiments, the signal DIN may comprise the computer readable instructions. In some embodiments, the signal DATA may comprise the computer readable instructions. In some embodiments, the signal DIN may comprise input that may be used along with the computer readable instructions provided in the signal DATA. Generally, the processor 30 may receive the signal DIN and execute the computer readable instructions based on the data in the signal DIN. However, the signal DIN may comprise an exploit. The exploit may be configured to alter an intended (or desired) operation of the computer readable instructions. The exploit may intentionally cause the processor 30 to perform operations that are undesirable to the end-user of the system 22. For example, the exploit may enable undesired access to personal data. In another example, the exploit may enable a bad actor to take control of operations of the system 22.

The processor 30 may be configured to generate the signal INST in response to the signal DIN and/or the signal DATA. The signal INST may comprise the computer readable instructions that may be executed by the processor 30. In an example, the computer readable instructions that may be executed by the processor 30 may be stored temporarily in a buffer (e.g., a trace buffer) until being executed. The processor 30 may present the signal INST to the exploit detection module 100 before the data in the signal INST is executed by the processor 30. The exploit detection module 100 may be configured to detect the exploit before the exploit is executed by the processor 30. Detecting the exploit before the exploit is executed may prevent the processor 30 from performing the undesired operations provided by the exploit. In some embodiments, the exploit detection module 100 (e.g., part of the system 24) may be a local component implemented on the same device as the processor 30. In some embodiments, the exploit detection module 100 may be implemented on a remote device (e.g., the signal INST may be an external connection between devices).

The exploit detection module 100 may be configured to receive the data in the signal INST and generate the signal EXPT in response to the signal INST. The signal EXPT may comprise a notification that the exploit has been detected. In some embodiments, the signal EXPT may only be generated by the exploit detection module 100 in response to detecting the exploit to provide an alert. In some embodiments, the signal EXPT may be generated in response to analyzing the computer readable instructions to indicate that the computer readable instructions are safe to execute (e.g., no exploit detected) or that the computer readable instructions are not safe to execute (e.g., the exploit was detected).

The exploit detection module 100 may be configured to analyzing the processor instructions in the signal INST in order to detect data flow instructions. The exploit detection module 100 may trim out the data flow instructions. For example, the exploit detection module 100 may be configured to detect a potential exploit using the data flow instructions alone. The exploit detection module 100 may be configured to compare the data flow instructions to a pre-defined pattern for exploit behavior. In response to detecting the pre-defined pattern for exploit behavior in the data flow instructions, the exploit detection module 100 may generate the signal EXPT. In an example, the signal EXPT may be presented to the processor 30.

The exploit detection module 100 may be configured to detect the exploit even without access to stored computer files, without access to operating systems and/or other system facilities. The pre-defined pattern of behavior of the exploit that the exploit detection module 100 may compare to may not be an anti-virus signature or a heuristic. The exploit detection module 100 may be configured to detect the pre-defined pattern of behavior that violates an intended processor instruction processing. The intended processor instruction processing may occur at the level of the processor 30. The exploit detection module 100 may detect the violation of the intended processor instruction processing by tracking control flow changes and/or the tracking changes to the real (e.g., physical) memory locations in the memory 32. In an example, legitimate control flow changes do frequently occur in the computer readable instructions. However, the exploits detected may be a specific subset of control flow changes that lead to code paths that did not exist before the exploit occurred. The real memory location may be a physical location on a RAM chip, a register and/or other physical location (e.g., the memory 32). Virtual memory may be used to make a single location available to multiple requesters at the same time.

The processor 30 may receive control flow instructions, which may be executed as long as the instructions can be executed within the physical bounds of the processor 30 and the system 22. The exploit detection module 100 may track the data flow instructions and/or memory locations in the memory 32 to identify a control flow change that may be caused by a malicious exploit. Since no objects are being analyzed by the exploit detection module 100, the pre-defined pattern of exploit behavior may not be a signature. The exploit detection module 100 may detect malicious actions only using the control flow instructions and the memory locations of the memory 32. For example, when an exploit occurs, the control flow instructions of the processor 30 may make changes to the data flow and the instructions may form a loop back to (e.g., return to) the physical memory location and/or instruction pointer (e.g., the location in the memory 32 may have the value for the instruction pointer).

In one example, the loop created by the exploit may be one control flow change with a return back to the start. In another example, the loop created by the exploit may be multiple changes with a return back to the start. The specific type of control flow change may be part of the pre-defined pattern of exploit detection used for comparison by the exploit detection module 100. Normal flow changes that lead to error handling or failures are not tracked as part of the exploit detection (e.g., error handing issues may be identifiable by the data).

In some embodiments, the exploit detection module 100 may be implemented to complement antivirus software. For example, the exploit detection module 100 may analyze the data flow instructions while the antivirus software scans files. In another example, the exploit detection module 100 may operate at the level of the processor 30, while the antivirus software may operate at the operating system level. The exploit detection module 100 may be configured to detect specific types of processor instructions and/or track memory locations of the memory 32, perform trimming to analyze the control flow instructions and/or detect returns in the instruction and/or the memory 32.

Figure 2:
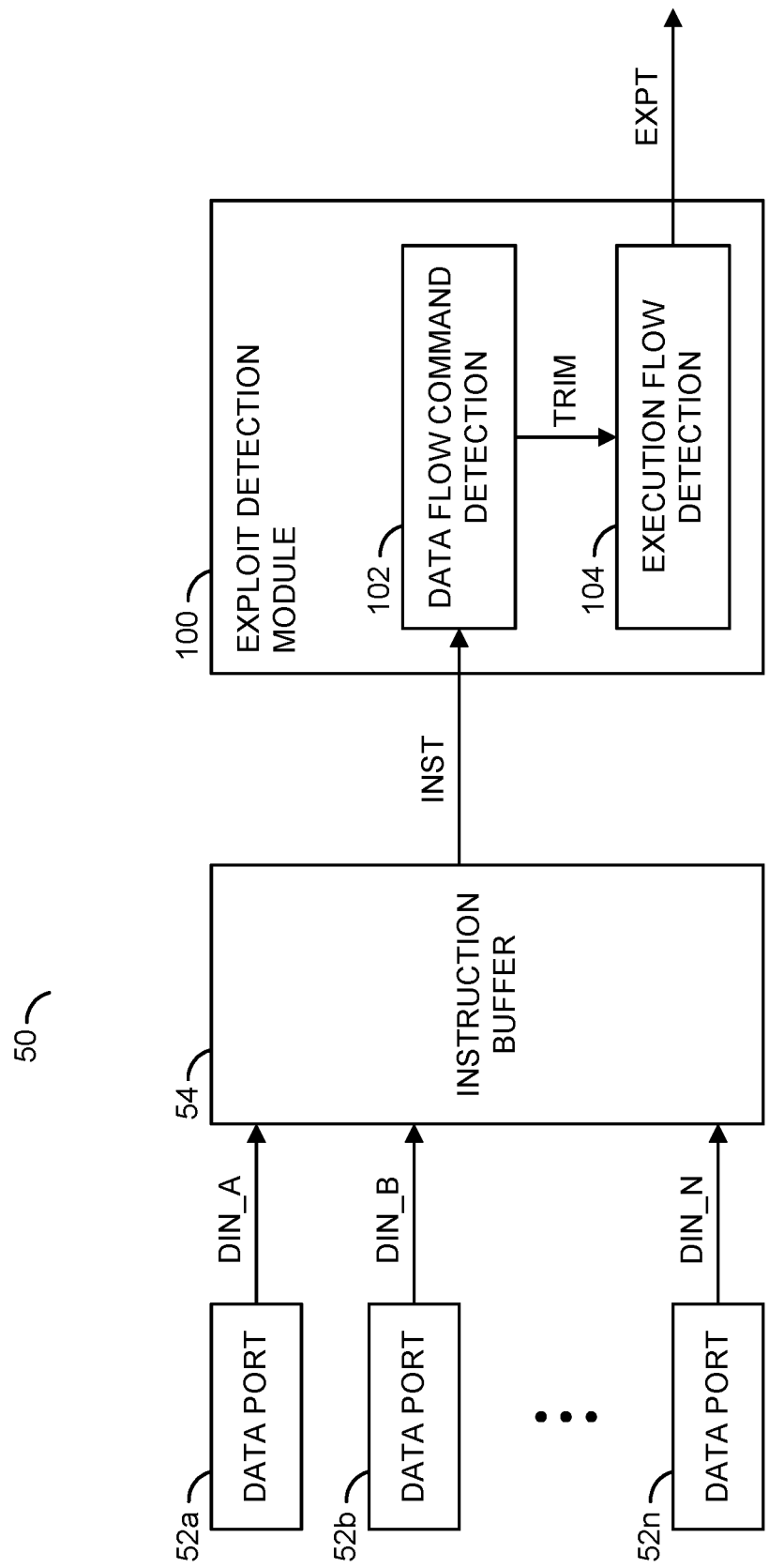
FIG. 2 is a block diagram illustrating exploit detection on a system-on-chip (SoC).

Referring to FIG. 2, a block diagram illustrating exploit detection on a system-on-chip (SoC) is shown. A system 50 is shown. The system 50 may be a SOC. In an example, the SoC 50 may be an implementation of the processor 30, described in association with FIG. 1.

The SoC 50 may comprise a number of blocks (or circuits) 52a-52n, a block (or circuit) 54 and/or the exploit detection module 100. The circuits 52a-52n may implement data ports (e.g., input ports). The circuit 54 may implement an instruction buffer (e.g., an input buffer). The SoC 50 may comprise other components (not shown). The number, type and/or arrangement of the components of the SoC 50 may be varied according to the design criteria of a particular implementation.

The data ports 52a-52n may be configured to receive input from external sources and/or external devices. The data ports 52a-52n may present the signals DIN_A-DIN_N to the instruction buffer 54. The signals DIN_A-DIN_N may comprise data input similar to the signal DIN described in association with FIG. 1. The data ports 52a-52n may be configured to receive input from an end-user (e.g., a mouse, a keyboard, a gamepad, etc.) The data ports 52a-52n may be configured to receive input from a storage medium (e.g., one of the data ports 52a-52n may be a SATA port that receives data from a HDD or SSD, one of the data ports 52a-52n may be a USB port that receives data from a thumb drive, etc.). The data ports 52a-52n may be configured to receive input from a remote device (e.g., one of the data ports 52a-52n may be an Ethernet port). One or more of the data ports 52a-52n may be vulnerable to receiving an exploit. The types of data ports 52a-52n implemented may be varied according to the design criteria of a particular implementation.

The instruction buffer 54 may be a memory buffer and/or a cache. The instruction buffer 54 may be configured to provide temporary storage for the computer readable instructions. For example, the computer readable instructions may be read out of the instruction buffer 54 to be executed by the processor 30. In some embodiments, the instruction buffer 54 may store a subset of the computer readable instructions (e.g., received in the signal DATA, not shown) and, depending on the decisions made by the processor 30, some or all of the computer readable instructions stored in the instruction buffer 54 may be executed by the processor 30. The computer readable instructions stored in the instruction buffer 54 may be either executed by the processor 30 at a later time, or discarded. The instruction buffer 54 may present the signal INST to the exploit detection module 100.

The exploit detection module 100 may comprise a block (or circuit) 102 and/or a block (or circuit) 104. The circuit 102 may implement a data flow command detection module. The circuit 104 may implement an execution flow detection module. The exploit detection module 100 may comprise other components (not shown). The number, type and/or arrangement of the components of the exploit detection module 100 may be varied according to the design criteria of a particular implementation.

The data flow command detection module 102 may be configured to detect data flow commands in the computer readable instructions. The data flow command detection module 102 may be configured to analyze the computer readable instructions. The data flow command detection module 102 may be configured to determine which of the computer readable instructions are data flow commands and which of the computer readable instructions are computational commands. The data flow command detection module 102 may be configured to strip out the computational commands, leaving only the data flow commands.

The data flow command detection module 102 may be configured to generate a signal (e.g., TRIM). The signal TRIM may comprise the data flow commands. The data flow command detection module 102 may be configured to trim the data flow commands from the computer readable instructions. In one example, the data flow instructions detected by the data flow command detection module 102 may comprise a creation of one or more instruction branches. The data flow command detection module 102 may be configured to trim out the data flow operations by removing computational commands and keeping interrupt commands and/or execution control flow commands. The trimmed data flow commands may be communicated to the execution flow detection module 104. The data flow command detection module 102 may present the signal TRIM to the execution flow detection module 104.

The execution flow detection module 104 may be configured to analyze the trimmed commands. The execution flow detection module 104 may be configured to compare the data flow commands in the signal TRIM to a pre-defined pattern for exploit behavior. If the pre-defined pattern for exploit behavior is detected, the execution flow detection module 104 may generate the signal EXPT comprising an alert that an exploit has been detected in the computer readable instructions. If the pre-defined pattern for exploit behavior is not detected, the execution flow detection module 104 may generate the signal EXPT comprising an indication that no exploit has been detected (e.g., an all-clear signal).

The pre-defined pattern of exploit behavior detected by the execution flow detection module 104 may comprise a change to the data flow at a level of the processor 30 that results in a new code path added by the exploit. The new code path may be detected in response to the execution flow detection module 104 tracking memory locations in the memory 32 for the data flow and determining whether the new code path returns to a specific location in the tracked memory locations. The execution flow detection module 104 may be configured to store a number of the data flow instructions in a rolling buffer. The execution flow detection module 104 may be configured to determine whether one or more of the data flow instructions in the signal TRIM continually refers back to one of the data flow instructions in the rolling buffer. The exploit behavior detected by the execution flow detection module 104 may comprise changes in a flow of execution at the level of the processor 30. The exploit behavior detected may comprise one or more of speculative execution exploits, operating system exploits, virtual machine exploits, application exploits, container exploits, real time operating system exploits, virtualized system exploits, code exploits, cloud platform exploits, firmware exploits, software exploits, etc. The types of exploits detected and/or the pre-defined patterns used by the execution flow detection module 104 to detect particular types of exploits may be varied according to the design criteria of a particular implementation.

In some embodiments, the exploit detection module 100 may be implemented in firmware of the SoC 50 (or the processor 30). In some embodiments, the exploit detection module 100 may be implemented as part of the microcode of a chipset. In one example, the exploit detection implemented by the exploit detection module 100 may be implemented at a BIOS level of the computer readable instructions of the processor 30. In another example, the exploit detection implemented by the exploit detection module 100 may be implemented at a UEFI level of computer readable instructions of the processor 30.

Figure 3:
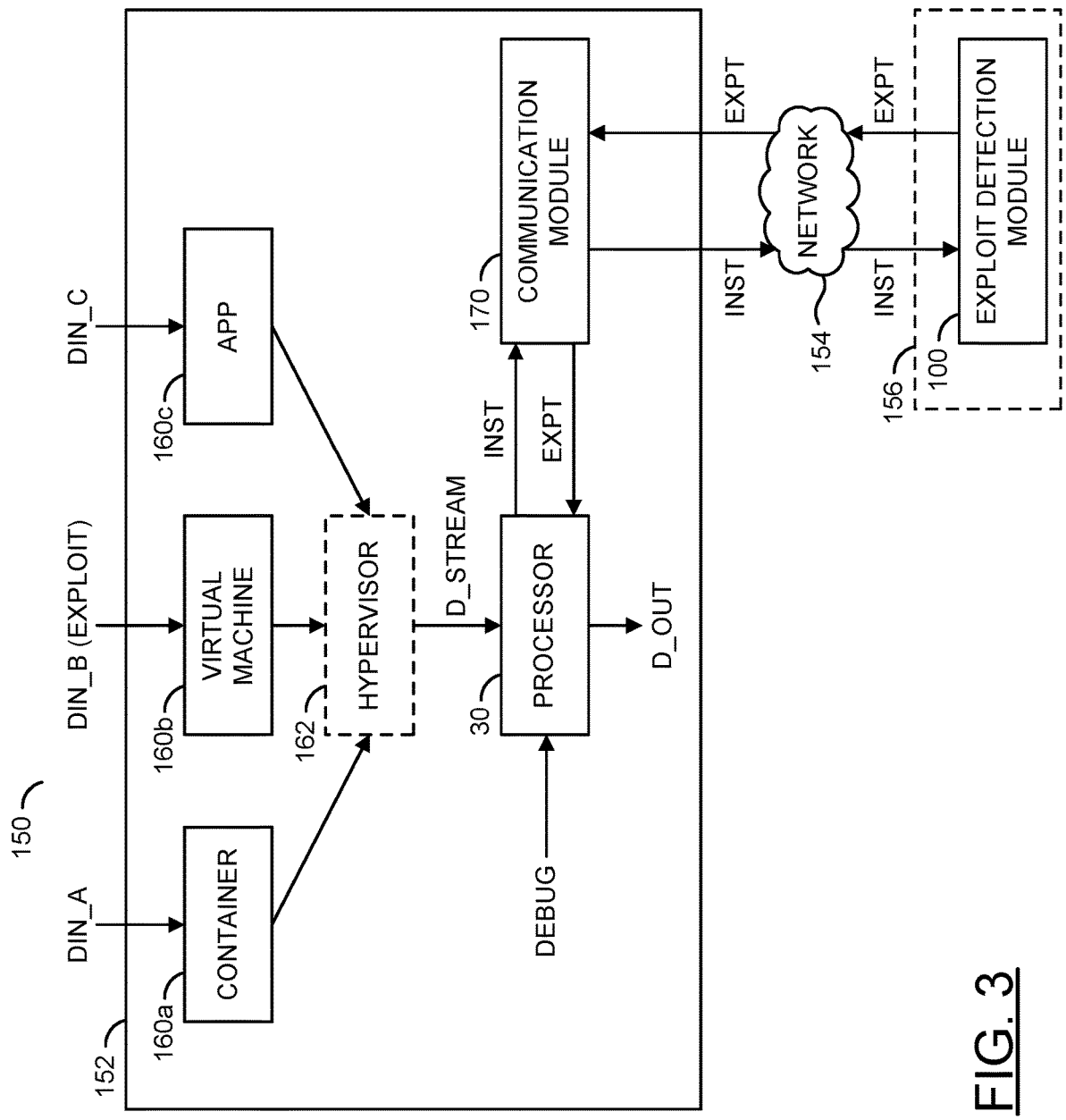
FIG. 3 is a block diagram illustrating a communication of processing instructions to a remote location for exploit detection.

Referring to FIG. 3, a block diagram illustrating a communication of processing instructions to a remote location for exploit detection is shown. A system 150 is shown. The system 150 may implement a use case scenario where the exploit detection module 100 is located remotely from the processor 30. For some design implementations (e.g., a TV or a camera system), there may not be external data communication capabilities to an external location and the exploit detection module 100 may be implemented locally. For other design implementations (e.g., a networked device in a data center that comprises a security operation to monitor processes), the exploit detection module 100 may be implemented remotely to enable streamed data alerts.

The system 150 may comprise the exploit detection module 100, a block (or circuit) 152, a network 154 and/or a remote location 156. The circuit 152 may implement a device. For example, the device may comprise a desktop computer, a laptop computer, a netbook, a tablet computing device, a smartphone, a server computer, etc. The implementation of the device 152 may be varied according to the design criteria of a particular implementation.

In some embodiments, the network 154 may implement a local area connection (LAN). For example, the exploit detection module 100 may be implemented externally from the device 152, but may be implemented on the same local network 154. In some embodiments, the network 154 may implement a wide area network (WAN). The network 154 may be the internet.

The remote location 156 may be a physical location that may be different than a location of the device 152. For example, the exploit detection module 100 may be implemented remotely from the device 152 (e.g., at a different location such as a different building, a different city, a different country, a different continent, etc.). The network 154 may enable a communication between the device 152 and the exploit detection module 100 located at the remote location 156. The type of the remote location 156 may be varied according to the design criteria of a particular implementation.

The device 152 may be configured to receive the signals DIN_A-DIN_N. In the example shown, the signal DIN_B may carry the exploit. The device 152 may be configured to communicate the signal INST to the network 154. The network 154 may forward the signal INST to the exploit detection module 100 at the remote location 156. The exploit detection module 100 may generate the signal EXPT in response to the analysis of the signal INST. The network 154 may forward the signal EXPT from the remote location 156 to the device 152.

The device 152 may comprise the processor 30, blocks (or circuits) 160a-160c, a block (or circuit) 162 and/or a block (or circuit) 170. The circuits 160a-160n may implement data sources. The circuit 162 may implement a hypervisor. The circuit 170 may implement a communication module 170. The device 152 may comprise other components (not shown). The number, type and/or arrangement of the components of the device 152 may be varied according to the design criteria of a particular implementation.

The data sources 160a-160c may be configured to perform operations on the data input signals DIN_A-DIN_C and provide input to the processor 30. In the example shown, the data source 160a that receives the data input signal DIN_A may be a container server. In the example shown, the data source 160b that receives the data input signal DIN_B may be a virtual machine. In the example shown, the data source 160c that receives the data input signal DIN_C may be an app or other executable program. While the exploit is shown in the data signal DIN_B as a representative example, any or all of the data sources may receive the exploit.

The hypervisor 162 may be an optional component. The hypervisor 162 may be configured to monitor, create and/or manage multiple virtual machines. In the example shown, the hypervisor 162 may receive the output from the data sources 160a-160c. The hypervisor may present a signal (e.g., D_STREAM). The signal D_STREAM may be a data stream comprising a combination of the data input signals DIN_A-DIN_C. The signal D_STREAM may be presented to the processor 30. The processor 30 may handle the signal D_STREAM similar to the signal DIN as described in association with FIG. 1. For example, the processor 30 may generate the computer readable instructions partially in response to the data stream signal D_STREAM.

The processor 30 may be configured to generate the signal INST and receive the signal EXPT. The signal INST may be presented to the communication module 170. The processor 30 may be configured to receive a signal (e.g., DEBUG). The processor 30 may generate a signal (e.g., D_OUT).

The signal D_OUT may comprise an output of the processor 30. The signal D_OUT may comprise data and/or decisions generated by the processor 30 in response to executing the computer readable instructions. For example, the signal D_OUT may comprise control signals presented to various actuators. In another example, the signal D_OUT may comprise input for various hardware connected to the device 152 (e.g., output to a graphics processing unit, output to an audio device, etc.). If the exploit is not detected and/or prevented, the exploit may alter the resulting signal D_OUT, which may generate undesired output and/or functionality.

The signal DEBUG may be configured to enable a debug feature of the processor 30. The debug feature of the processor 30 may enable the processor 30 to perform debugging. The debugging may enable the computer readable instructions to be sent out to the communication module 170 for analysis by the exploit detection module 100. For example, the debugging may trace out the instructions of the processor 30.

The communication module 170 may be configured to receive the signal INST from the processor 30. The communication module 170 may be configured to implement one or more communication protocols. In one example, the communication module 170 may implement an Ethernet protocol. In another example, the communication module 170 may implement a Wi-Fi protocol. In yet another example, the communication module 170 may implement a Bluetooth protocol. The communication module 170 may comprise an antenna. The type of communications implemented by the communication module 170 may be varied according to the design criteria of a particular implementation.

The communication module 170 may be configured to send the instructions to the remote location 156 via the network 154. The communication module 170 may receive the result of the analysis by the exploit detection module 100 via the signal EXPT. The communication module 170 may present the signal EXPT to the processor 30. The processor 30 may perform a response to the signal EXPT when an exploit is detected (e.g., shutdown, pause execution of the computer readable instructions, etc.).

Implementing a virtualization layer such as the hypervisor 162 may enable instructions to be performed without reaching the hardware level. However, the exploit detection module 100 may still detect an exploit because even when the exploit is implemented at a level above the processor 30 (e.g., such as in UEFI, BIOS or a virtualization layer), the processor 30 may still have to make the same types of changes (e.g., the pre-defined pattern of changes) regardless of where the exploit occurs. In another example, even if the exploit is built into the processor 30 (e.g., developers intentionally put a function that can be exploited into code), the exploit detection module 100 may still detect the pre-defined pattern of exploit behavior because of the data flow changes at the chip level.

Implementing the exploit detection module 100 at the remote location 156 may enable the exploit detection to be provided as a service. For example, end-users (e.g., a user of the device 152 and multiple other users) may stream data to the exploit detection module 100 and the exploit detection module 100 may communicate the results of the analysis back. For example, the operations performed by the exploit detection module 100 may be implemented as part of a software security suite provided in a cloud computing service. In some embodiments, the functionality of the data flow command detection module 102 (e.g., the trimming functions) may be implemented as part of the functionality of the processor 30. The exploit detection module 100 may receive the trimmed instructions and perform the comparison to the pre-defined pattern of exploit detection as part of a security stack.

The exploit notification in the signal EXPT and/or the functionality of the data trimming performed by the data flow command detection module 102 may be system agnostic, OS agnostic and/or chip agnostic. The exploit detection module 100 may be implemented on network devices, systems that only run Kubernetes, docker and/or VMware.

In the embodiment of the system 150, a processing debug feature may be enabled. The processing debug feature may be enabled in response to the signal DEBUG. The processor instructions in the signal INST may be communicated to the external location 156 with the exploit detection module 100. The exploit detection module 100 may compare the trimmed instructions to the pre-defined pattern of exploit behavior and generate the signal EXPT from the remote location 156.

Figure 4:
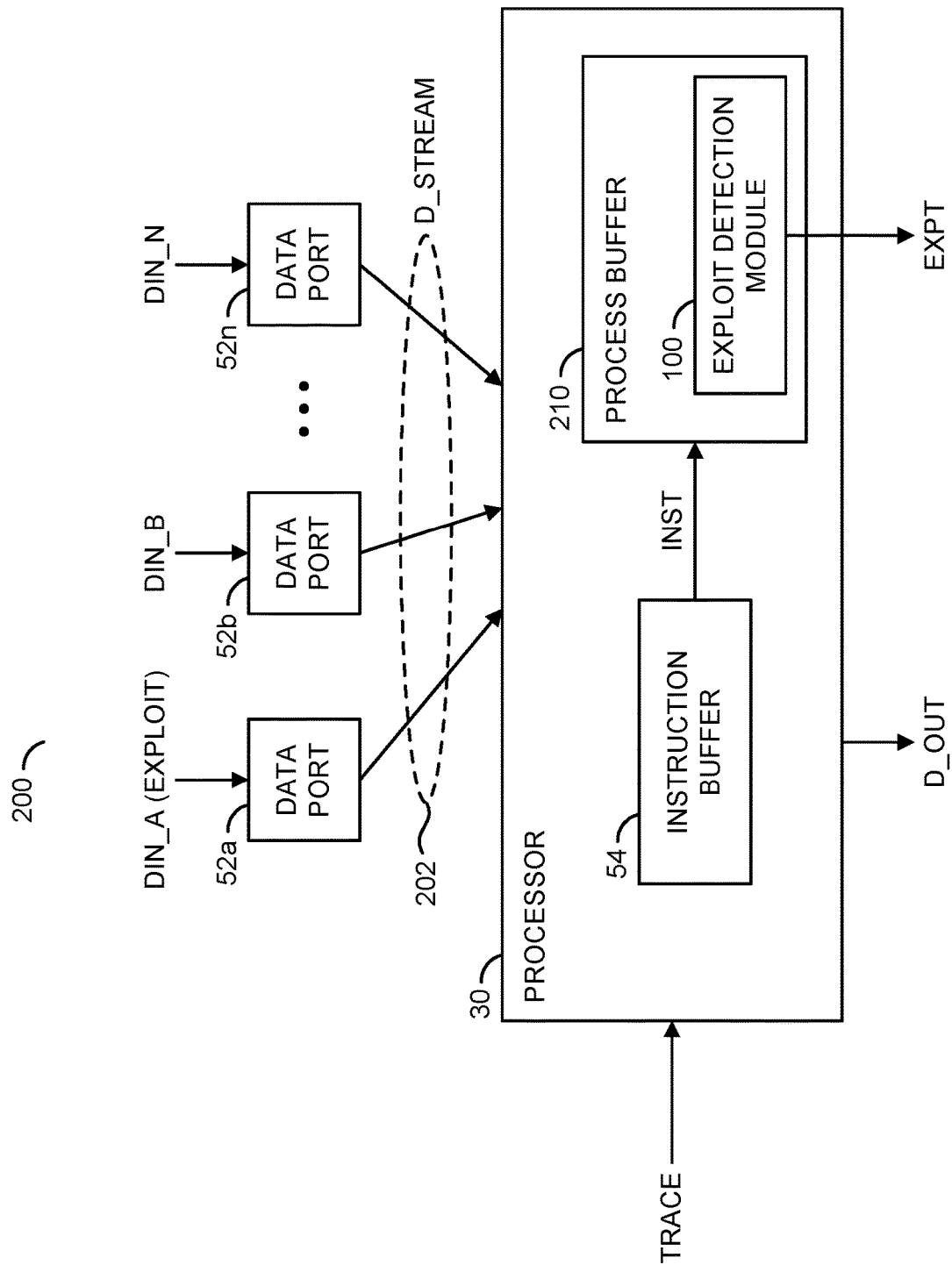
FIG. 4 is a block diagram illustrating exploit detection implemented in a process buffer of a processor.

Referring to FIG. 4, a block diagram illustrating exploit detection implemented in a process buffer of a processor is shown. An example system 200 is shown. The system 200 may comprise the processor 30 and/or the data ports 52*a*-52*n*. The data ports 52*a*-52*n* may each receive one of the data input signals DIN_A-DIN_N, respectively. In the example shown, the exploit may be in the data input DIN_A. The data ports 52*a*-52*n* may present a data stream 202 (e.g., the signal D_STREAM) to the processor 30.

The processor 30 may be configured to receive the signal D_STREAM. The processor 30 may be configured to generate the signal D_OUT and/or the signal EXPT. The processor 30 may receive a signal (e.g., TRACE). The signal TRACE may be configured to enable a trace function of the processor 30.

The processor 30 may comprise the instruction buffer 54 and/or a block (or circuit) 210. The circuit 210 may implement a process buffer. The processor 30 may comprise other components (not shown). The number, type and/or arrangement of the components of the processor 30 may be varied according to the design criteria of a particular implementation.

In a default mode of operation, the processor 30 may execute the computer readable instructions stored in the instruction buffer 54. For example, the processor 30 may receive the data stream signal D_STREAM, execute the computer readable instructions in the instruction buffer 54 based on the data in the data stream signal D_STREAM and generate the signal D_OUT.

The trace signal TRACE may enable a trace mode of operation. The trace mode of operation may enable the on-chip functionality of the exploit detection module 100. In response to enabling the trace mode of operation, the instruction buffer 54 may provide the computer readable instructions to the process buffer 210 via the signal INST.

The process buffer 210 may be configured to store a portion of the computer readable instructions. The exploit detection module 100 may be implemented as a component within the process buffer 210. The exploit detection module 100 may be configured to read out the processor instructions from the processor instruction buffer 210. In response to the analysis of the trimmed data flow instructions, the exploit detection module 100 may generate the signal EXPT.

In the embodiment of the system 200, a trace function of the processor 30 may be enabled. The trace feature may be enabled in response to the signal TRACE. The processor instructions may be read out from the processor instruction buffer 54. In one example, the processor instructions in the signal INST may be communicated to the external location 156 with the exploit detection module 100. The exploit detection module 100 may compare the trimmed instructions to the pre-defined pattern of exploit behavior and generate the signal EXPT from the remote location 156. In another example, the processor instructions may be written to the processor buffer 210. The exploit detection module 100 may compare the trimmed instructions to the pre-defined pattern of exploit behavior and generate the signal EXPT at the processor buffer 210.

Figure 5:
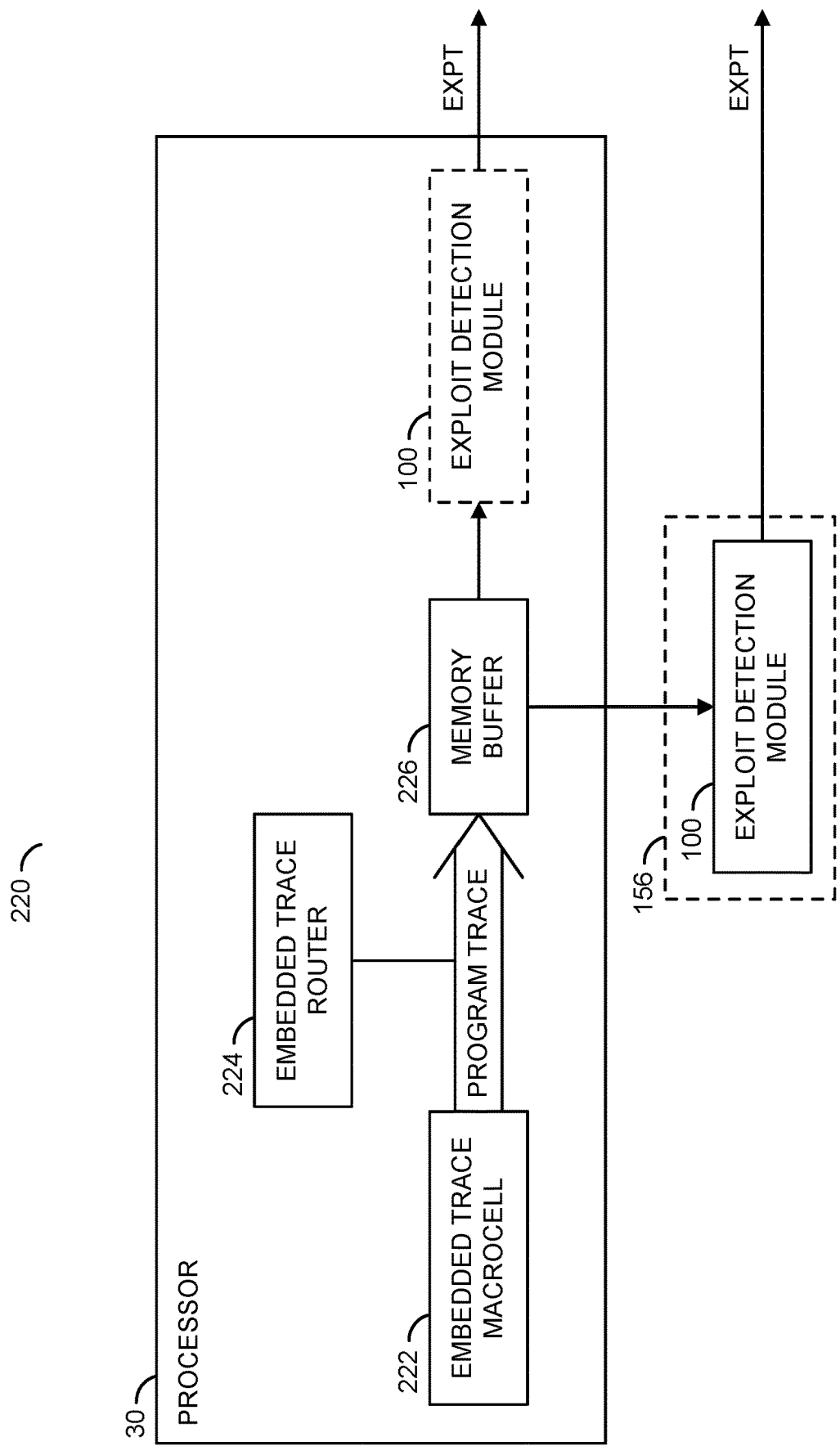
FIG. 5 is a block diagram illustrating exploit detection performed in response to a trace function.

Referring to FIG. 5, a block diagram illustrating exploit detection performed in response to a trace function is shown. A system 220 is shown. The system 220 may comprise the processor 30. In some embodiments, the exploit detection module 100 may be implemented local to the processor 30 (e.g., on-chip). In some embodiments, the exploit detection module 100 may be implemented remotely from the processor 30 (e.g., at the remote location 156).

The processor 30 may comprise a block (or circuit) 222, a block (or circuit) 224 and/or a block (or circuit) 226. The circuit 222 may implement an embedded trace macrocell. The circuit 224 may implement an embedded trace router. The circuit 226 may implement a memory buffer. The processor 30 may comprise other components (not shown). The number, type and/or arrangement of the components of the processor 30 may be varied according to the design criteria of a particular implementation.

The embedded trace macrocell 222 may implement a real-time trace module. The embedded trace macrocell 222 may be configured to provide instructions and data tracing for the processor 30. In an example, the processor 30 may implement an ARM processor architecture and the embedded trace macrocell 222 may enable debugging for the processor 30. A program trace of the operations of the processor 30 may be generated by the embedded trace macrocell 222. In one example, the embedded trace macrocell 222 may export trace data through a trace port. In another example, the embedded trace macrocell 222 may write the trace information to the on-chip memory buffer 226. The trace data generated by the embedded trace macrocell 222 may be compressed (e.g., address information may only be output branches to a particular location, higher order bits of a memory address may not be output, only data may be output, only addresses may be output, etc.).

The embedded trace router 224 may be configured to implement a trace sink. The embedded trace router 224 may be configured to write and/or format the trace data generated by the embedded trace macrocell 222 to the memory buffer 226. The embedded trace router 224 may enable a self-hosted trace by acting as a bridge between the trace performed by the embedded trace macrocell 222 and the memory buffer 226. In some embodiments, the embedded trace router 224 may be configured to export the trace data to an external debugger (e.g., the exploit detection module 100 implemented externally at the remote location 156).

The memory buffer 226 may be configured to provide temporary storage for the trace information. The trace information may comprise the computer readable instructions that may be executed by the processor 30. In some embodiments, the memory buffer 226 may implement a circular buffer. In some embodiments, the memory buffer 226 may implement a first-in-first-out buffer.

For the circular buffer embodiment of the memory buffer 226, the embedded trace router 224 may continuously write the trace information to the memory buffer 226. When the end of the memory buffer 226 is reached, the embedded trace router 224 may continue to write the trace information from the start of the memory buffer 226 (e.g., overwrite the oldest data in the memory buffer 226). Implementing the memory buffer 226 as a circular buffer may enable the trace data to be captured continuously and provide the most recent history of the computer readable instructions.

For the first-in-first-out buffer embodiment of the memory buffer 226, the embedded trace router 224 may continuously write the trace information to the memory buffer 226. When the memory buffer 226 is full, the trace may be stopped until space becomes available. For example, the first-in-first-out buffer embodiment of the memory buffer 226 may be configured as an intermediate buffer while the exploit detection module 100 concurrently reads out the trace data.

In some embodiments, the exploit detection module 100 may be implemented locally on the processor 30. The exploit detection module 100 may provide local analysis of the computer readable instructions. The exploit detection module 100 may be configured to read out the instructions from the memory buffer 226, trim the data flow instructions and/or detect the exploit behavior. The exploit detection module 100 may generate the signal EXPT in response to the analysis of the data flow instructions. For the local analysis, the signal EXPT may be an internal signal that may be acted upon by the processor 30.

In some embodiments, the exploit detection module 100 may be implemented externally from the processor 30. The exploit detection module 100 may be implemented at the remote location 156 (e.g., on a device separate from the processor 30 and/or the system 22). The embedded trace router 224 may be configured to format the trace information for export. The memory buffer 226 may export the trace information to the external location 156. The exploit detection module 100 may be configured to receive the instructions at the external location, trim the data flow instructions and/or detect the exploit behavior. The exploit detection module 100 may generate the signal EXPT in response to the analysis of the data flow instructions. For the external analysis, the signal EXPT may be communicated back to the system 22 and then to the processor 30. Implementing the exploit detection module 100 at the external location 156 may enable the functionality of the exploit detection to be provided as a service. Implementing the exploit detection module 100 at the external location 156 may add an overhead amount of time for the processor 30 to execute the computer readable instructions (e.g., a time for communicating the signal INST to the external location 156 and a time for communicating the signal EXPT back to the system 22).

In the embodiment of the system 220, a trace function of the processor 30 may be enabled. The trace feature may be enabled in response to the signal TRACE. In one example, the processor instructions in the signal INST may be communicated to the external location 156 with the exploit detection module 100. The exploit detection module 100 may compare the trimmed instructions to the pre-defined pattern of exploit behavior and generate the signal EXPT from the remote location 156.

Figure 6:
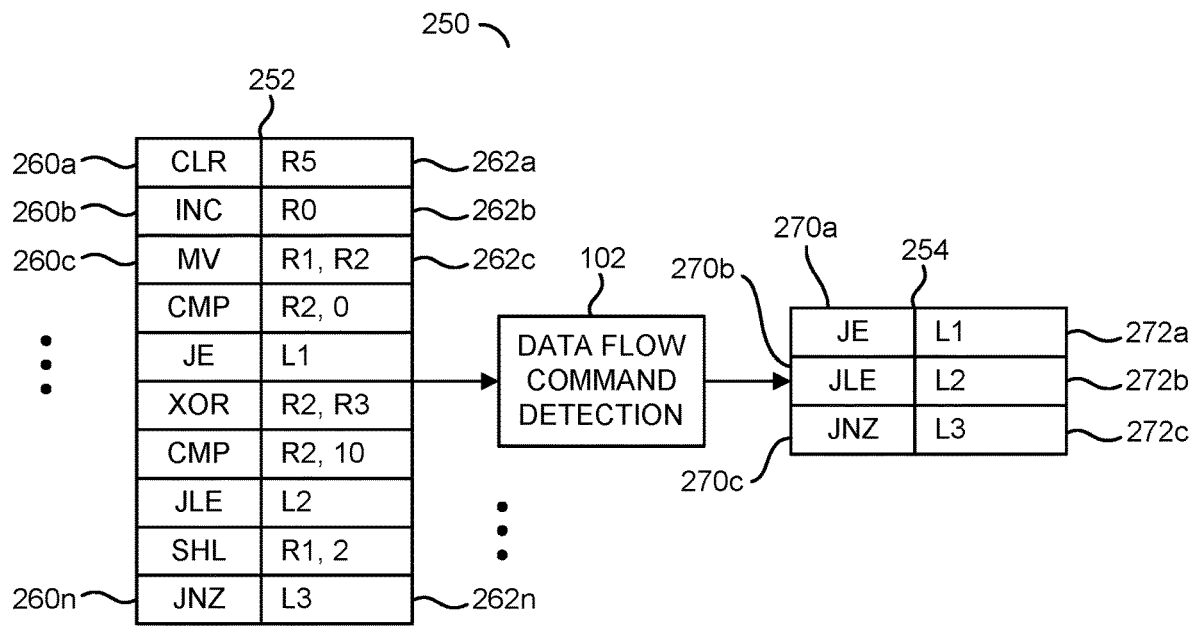
FIG. 6 is a diagram illustrating trimming out data flow instructions from process instructions.

Referring to FIG. 6, a diagram illustrating trimming out data flow instructions from process instructions is shown. A data trimming example 250 is shown. The data trimming example 250 may be an illustrative and/or simplified example of the operations performed by the data flow command detection module 102.

The data trimming example 250 may comprise the data flow command detection module 102, computer readable instructions 252 and/or trimmed computer readable instructions 254. The computer readable instructions 252 may comprise data presented to the data flow command detection module 102 in the signal INST. In an example, the computer readable instructions 252 may be read out from the memory buffer 226, the instruction buffer 54, generated in response to the signal DEBUG and/or generated in response to the signal TRACE. The trimmed computer readable instructions 254 may be generated by the data flow command detection module 102 in response to the signal INST. The trimmed computer readable instructions 254 may comprise data presented in the signal TRIM generated by the data flow command detection module 102.

The computer readable instructions 252 may comprise respective opcode mnemonics 260a-260n and/or operands 262a-262n. The opcode mnemonics 260a-260n may be representative examples of operations and/or functions that may be performed by the processor 30 when executing the computer readable instructions 252. The operands 262a-262n may comprise memory locations, constants, registers, variables, labels, etc. The operands 262a-262n may comprise the data that the opcode mnemonics 260a-260n may be operated on.

Generally, each of the respective operands 262a-262n may correspond to a respective one of the opcodes 260a-260n. In some embodiments, the some of the opcodes 260a-260n may be performed without having one of the operands 262a-262n. In one example, the opcode 260a may be an operation that clears the operand 262a (e.g., register five). In another example, the opcode 260b may be an operation that increments the operand 262b (e.g., register zero). In yet another example, the opcode 260c may be an operation that moves the data from register one to register two (e.g., the operand 262c). In still another example, the opcode 260n may comprise an operation that jumps to the operand 262n (e.g., the location L3) if a value is not equal to zero. The opcodes 260a-260n and/or the operands 262a-262n may be representative examples that do not represent any particular programming language and/or processor instruction set. The types of data in and/or the format of the computer readable instructions 252 may be varied according to the design criteria of a particular implementation.

The data flow command detection module 102 may be configured to strip out (e.g., trim off) computational commands. In one example, the computational commands may be an addition operation (e.g., EAX+EAB→EAX). For example, the opcodes 260a-260d (e.g., CLR, INC, MV, CMP), the opcodes 260f-260g (e.g., XOR, CMP), and the opcodes 260m (e.g., SHL) may be computational commands. The data flow command detection module 102 may be configured to keep interrupt commands and/or execution control flow commands. In an example, a FUP command may be an interrupt command for Intel chipsets. In the example shown, the opcodes 260e (e.g., JE), the opcodes 260h (e.g., JLE) and the opcodes 260n (e.g., JNZ) may be execution control flow commands. In some embodiments, the data flow command detection module 102 may store a list of computational commands and a list of data flow commands for a particular processor architecture in order to compare against the computer readable instructions 252.

The trimmed computer readable instructions 254 may comprise the data flow opcode mnemonics 270a-270c and/or the respective data flow operands 272a-272c. The data flow command detection module 102 may generate the trimmed computer readable instructions 254 from the computer readable instructions. For example, the trimmed computer readable instructions 254 may comprise a selected subset of the computer readable instructions 252. In the example shown, the trimmed opcode 270a and trimmed operand 272a may be the JE operation for the location L1 that corresponds to the opcode 260e and the operand 262e, the trimmed opcode 270b and trimmed operand 272b may be the JLE operation for the location L2 that corresponds to the opcode 260h and the operand 262h and the trimmed opcode 270c and trimmed operand 272c may be the JNZ operation for the location L3 that corresponds to the opcode 260n and the operand 262n. Generally, the trimmed computer readable instructions 254 may not comprise personal information. For example, any personal information may not be capable of being read without providing additional key data and the data exploit detection module 100 may not collect the key data.

In the example shown, the trimmed computer readable instructions 254 may comprise three instructions. The data flow command detection module 102 may be configured to store an array of the trimmed computer readable instructions 254. In an example, the data flow command detection module 102 may be configured to store an array of ten packets from the computer readable instructions 254. The size of the array and/or the number of previous packets stored may be varied according to the design criteria of a particular implementation.

Figure 7:
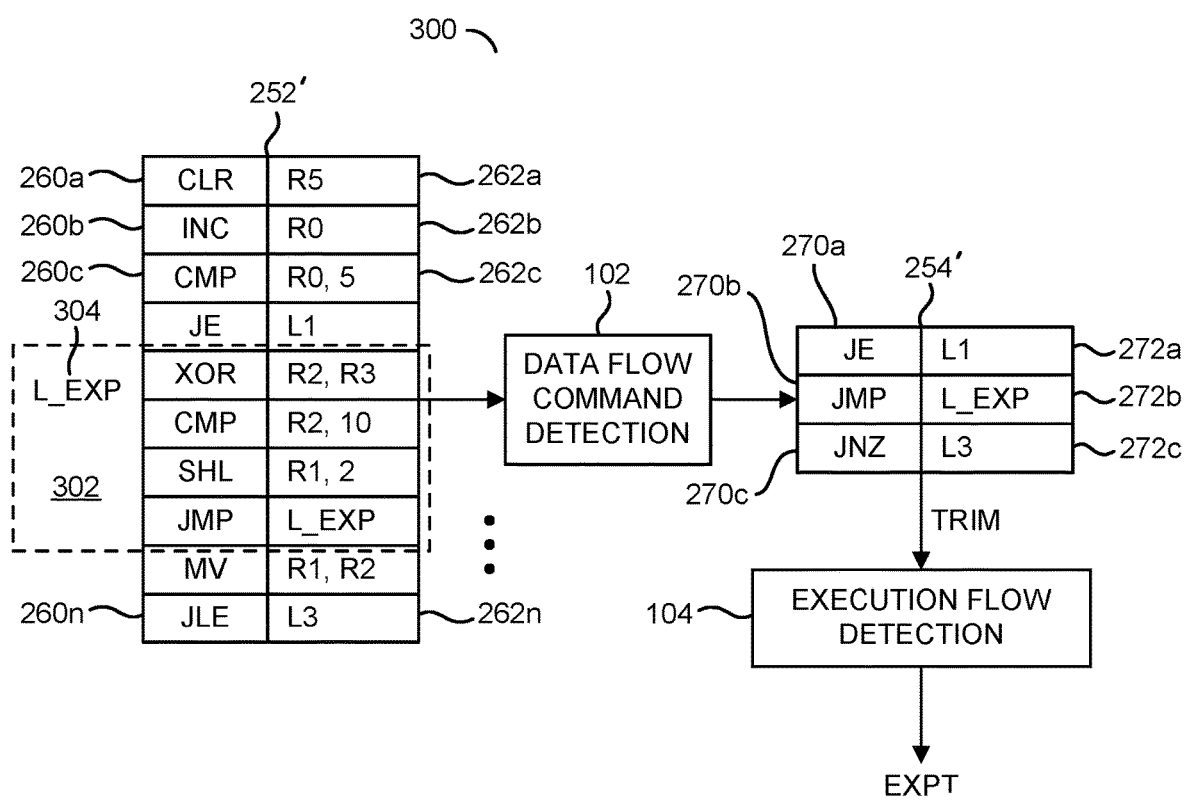
FIG. 7 is a diagram illustrating detecting an exploit in data flow instructions based on detecting a new code path.

Referring to FIG. 7, a diagram illustrating detecting an exploit in data flow instructions based on detecting a new code path is shown. An exploit example 300 is shown. The exploit example 300 may be an illustrative and/or simplified example of the operations performed by the data flow command detection module 102 and/or the execution flow detection module 104.

Similar to the data trimming example 250 shown in association with FIG. 6, the exploit example 300 may comprise the data flow command detection module 102, the computer readable instructions 252' and/or trimmed computer readable instructions 254'. The exploit example 300 may further comprise the execution flow detection module 104. After the data flow command detection module 102 generates the trimmed computer readable instructions 254', the trimmed computer readable instructions 254' may be communicated to the execution flow detection module 104 via the signal TRIM. The execution flow detection module 104 may be configured to detect the pre-defined pattern of exploit behavior and/or generate the signal EXPT to indicate whether or not an exploit has been detected.

In the example shown, the computer readable instructions 252' may comprise an exploit 302. The exploit 302 may comprise a sequence of instructions injected into the computer readable instructions 252'. In the example shown, the exploit 302 may comprise a sequence of four of the opcodes (e.g., the exploit opcodes 260e-260h comprising an XOR command, a CMP command, a SHL command and a JMP command). The last opcode 260h in the exploit 302 may implement a return command. The return command may comprise the JMP opcode 260h and the operand 262h may indicate a location L_EXP. For example, when the processor 30 executes the opcode 260h, the processor 30 may return to the location L_EXP indicated by the operand 262h. In the example shown, the location L_EXP may be at a memory location 304 in the memory 32. The memory location 304 may correspond to the first opcode 260e at the start of the exploit 302 (e.g., the XOR command). For example, the exploit 302 may comprise a number of instructions and then may loop back (or return) to a particular physical memory location in order to keep running.

The data flow command detection module 102 may analyze the computer readable instructions 252' to generate the trimmed computer readable instructions 254'. The trimmed computer readable instructions 254' may comprise one or more data flow commands from the exploit 302. In the example shown, the trimmed opcode 270b and the trimmed operand 272b may correspond to the JMP opcode to the location L_EXP of the exploit 302. The trimmed computer readable instructions 254' may be communicated to the execution flow detection module 104 via the signal TRIM.

The execution flow detection module 104 may be configured to perform address tracking. The execution flow detection module 104 may track the physical memory addresses in the memory 32 of the processor output in a list array. For example, the trace packets may be communicated to the data flow command detection module 102, the data flow command detection module 102 may generate the trimmed computer readable instructions 254' and the execution flow detection module 104 may store the trimmed computer readable instructions 254' in a rolling array that may comprise the physical memory addresses of the memory 32. The array implemented by the execution flow detection module 104 may be cut down to the last ten physical addresses. The execution flow detection module 104 may analyze the physical addresses in the trimmed computer readable instructions 254' in order to compare to the pre-defined pattern of exploit behavior.

The pre-defined pattern of exploit behavior may comprise detecting return instructions. In some embodiments, the return instructions may be indicated as a RET instruction. Generally, malicious code comprises at least one RET instruction. For example, the RET instructions may become a TIP and FUP instruction to the processor 30. The pre-defined pattern of the exploit 302 may comprise recurrences of the same physical address. For example, the execution flow detection module 104 may detect the pre-defined pattern of exploit behavior as a lot of situations where the physical address is repeated. The execution flow detection module 104 may detect the exploit behavior based on the interrupt and control flow commands in the trimmed computer readable instructions 254'. In an example, the execution flow detection module 104 may be configured to detect a sequence of events that documentation provided by the developers of the processor 30 indicate should not happen (e.g., the sequence of events occurs because of the exploit 302).

For example, when a change is requested (e.g., by the data sources 160a-160c), an interrupt may be requested. A specific packet may be sent to the processor 30 to make the change. In an example, for an Intel chipset, the interrupt packet may be a fup command. The data flow command detection module 102 may record the memory address location where the change request came from. The trimmed computer readable instructions 254 may comprise a rolling buffer of the last ten of the packets received. The next packet that is received by the processor 30 may indicate where to go to next in the computer readable instructions 252 in response to the requested change. Generally, for a legitimate data flow change, there may be an error handler that is the target of one of the computer readable instructions 252 in the sequence. However, for an exploit, the exploit may return back to where the flow change occurred. Returning back to the location where the flow change occurred may enable the program (or app, or OS, or code) to continue running by handing the control back to the process. Returning back to the location where the data flow change occurred may enable the exploit to remain active, perform the illegitimate operations and override the legitimate operations in the computer readable instructions 252.

The exploit detection module 100 may add an overhead to the processor 30 and/or the memory 32. In one example, there may be a maximum 5% hit to usage of the processor 30. In another example, the maximum hit to the processor 30 may be 3%. The usage of the memory 32 caused by the exploit detection module 100 may be a 2-3% overhead. Since the exploit detection module 100 performs real time alerting, the data may not need to be held in a large memory blob.

Figure 8:
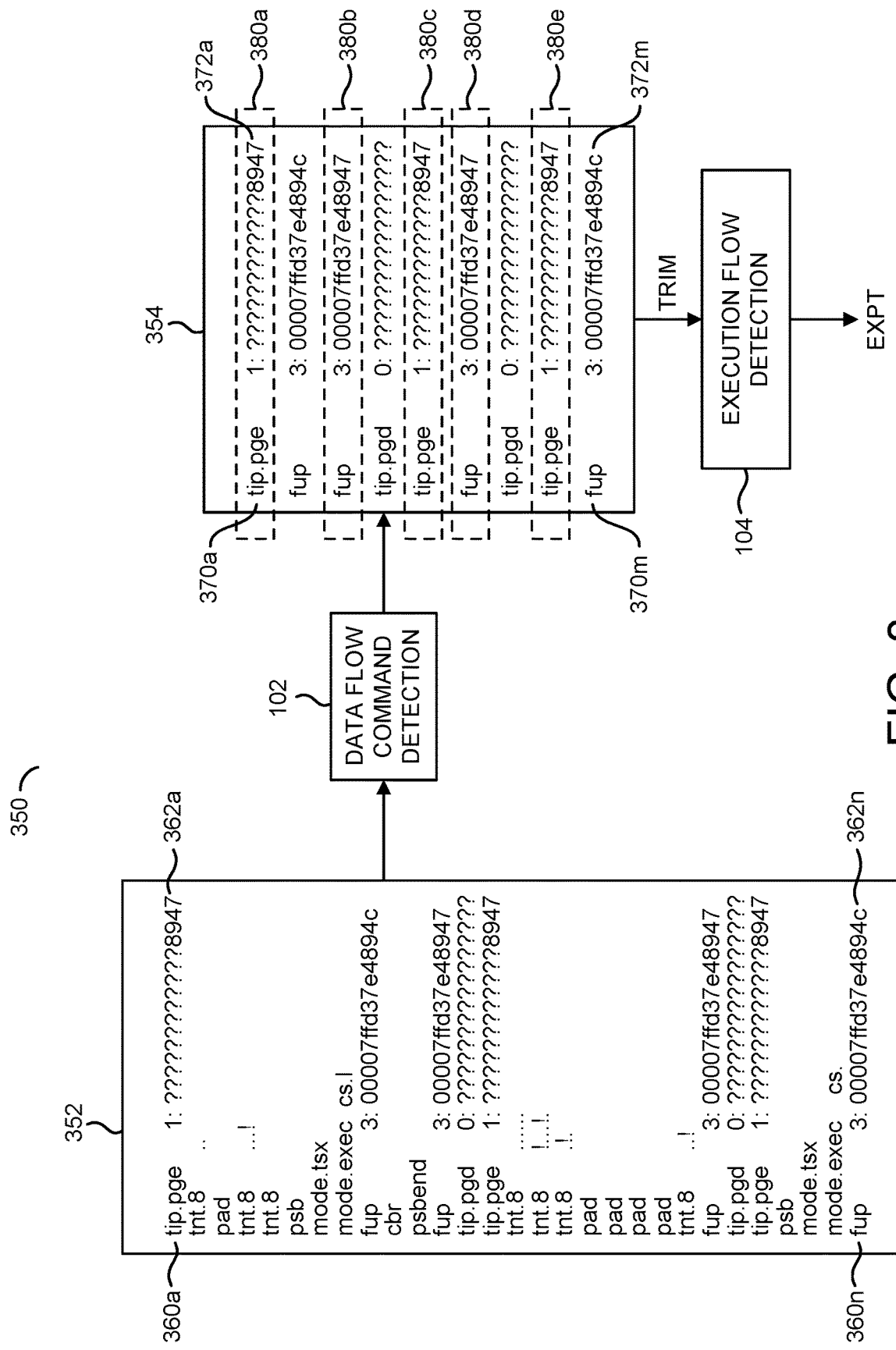
FIG. 8 is a diagram illustrating tracking physical memory locations to detect an exploit in data flow instructions.

Referring to FIG. 8, a diagram illustrating tracking physical memory locations to detect an exploit in data flow instructions is shown. An example exploit detection 350 is shown. The example exploit detection 350 may comprise the data flow command detection module 102, the execution flow detection module 104, a trace output 352 and/or a data flow instructions array 354.

The trace output 352 may be generated by the embedded trace macrocell 222. The trace output 352 may represent the computer readable instructions that may be executed by the processor 30. For example, the embedded trace macrocell 222 may generate the trace output 352 in response to enabling a trace feature of the processor 30 (e.g., in response to the signal TRACE and/or the signal DEBUG). The data flow command detection module 102 may read out the trace output 352 from the memory buffer 226.

The computer readable instructions 352 may comprise packet types 360a-360n and/or memory locations 362a-362n. In an example, the packet type 360a may comprise an interrupt command (e.g., tip.pge). In another example, the packet type 360b may comprise computation command (e.g., tnt.8). In yet another example, the packet type 360n may comprise an interrupt command (e.g., fup).

The memory locations 362a-362n may comprise physical memory locations in the memory 32 of an instruction. Not all of the packet types 360a-360n may have a corresponding one of the memory locations 362a-362n. The trace output 352 may be compressed by the embedded trace macrocell 222 in order to save space. For example, the trace output generated by the embedded trace macrocell 222 may not write out all of the most significant bits of an address of the memory locations 362a-362n (e.g., the address may be inferred based on the least significant bits).

The data flow command detection module 102 may be configured to analyze the packet types 360a-360n of the trace output 352. The data flow command detection module 102 may trim computer readable instructions down to the data flow instructions in the rolling array 354. The trimmed data flow instructions in the array 354 may comprise a subset of the packet types 360a-360n. The trimmed data flow instructions in the array 354 may comprise data flow commands 370a-370m and physical memory locations 372a-372m that correspond a subset of the packet types 360a-360n and the memory locations 362a-362n from the trace output 352. In the example shown, the rolling array 354 is shown outside of the execution flow detection module 104, for illustrative purposes. Generally, the rolling array 354 may be implemented by the execution flow detection module 104 and may comprise the trimmed data flow instructions provided by the signal TRIM.

In an example, the data flow instructions array 354 may comprise Taken Not-Taken (TNT) packets (e.g., packets that track a "direction" of direct conditional branches (taken or not taken). In another example, the data flow instructions array 354 may comprise Target IP (TIP) packets (e.g., packets that record the target IP of indirect branches, exceptions, interrupts, and other branches or events). In yet another example, the data flow instructions array 354 may comprise Flow Update Packets (FUP) packets (e.g., packets that provide the source IP addresses for asynchronous events (interrupt and exceptions), as well as other cases where the source address cannot be determined from the binary data). In still another example, the data flow instructions array 354 may comprise MODE packets (e.g., packets that provide a decoder with important processor execution information so that the processor 30 may properly interpret the dis-assembled binary and trace log. MODE packets have a variety of formats that indicate details such as the execution mode (16-bit, 32-bit, or 64-bit)). In another example, the data flow instructions array 354 may comprise packets inserted by software. The data flow commands 370a-370m extracted from the trace output 352 by the data flow command detection module 102 and stored in the rolling array 354 may be varied according to the design criteria of a particular implementation.

The data flow instructions stored in the rolling array 354 may be analyzed by the execution flow detection module 104. The execution flow detection module 104 be configured to detect a return-oriented programming chain. Return instructions 380a-380e are shown. The return instructions 380a-380e may be a subset of the data flow commands 370a-370m in the data flow commands array 354. The return instructions 380a-380e may comprise the data flow commands 370a-370m that have the same (e.g., repeated) physical memory locations 372a-372m. In the example shown, the return instructions 380a-380e may point to the physical memory location of the memory 32 with the same least significant bits of 8947. Other of the data flow commands 370a-370m that have different (e.g., non-recurring) physical memory locations 372a-372m may not be part of the return instructions 380a-380e. During normal operation, physical memory locations may be repeated without being an exploit. However, since the execution flow detection module 104 implements the array 354 with the last ten of the physical memory locations, the execution flow detection module 104 may detect many repeated physical memory locations within a limited number of the recent computer readable instructions. The execution flow detection module 104 may be configured to detect return oriented exploits, shell code insertion exploits, break outs from applications, etc.

The return instructions 380a-380e may illustrate the detection of the exploit by the execution flow detection module 104. The execution flow detection module 104 may generate the signal EXPT in response to analyzing the data flow instructions stored in the array 354. In the example shown, in response to detecting the return instructions 380a-380e, the signal EXPT may provide a notification and/or an alert of the detect exploit and/or physical locations of the exploit in the memory 32 in the computer readable instructions.

Figure 9:
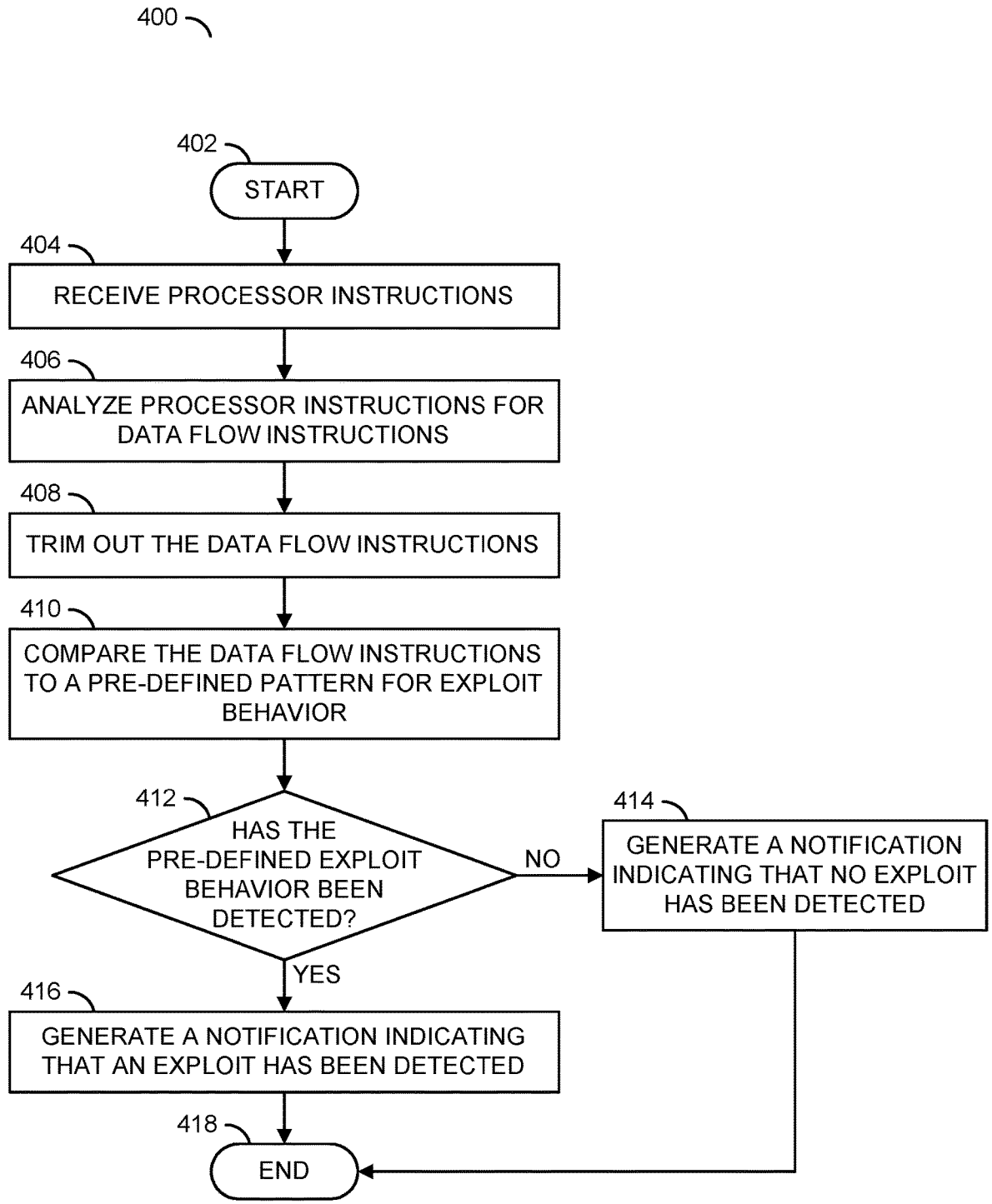
FIG. 9 is a flow diagram illustrating a method for implementing exploit detection for chipsets.

Referring to FIG. 9, a method (or process) 400 is shown. The method 400 may implement exploit detection for chipsets. The method 400 generally comprises a step (or state) 402, a step (or state) 404, a step (or state) 406, a step (or state) 408, a step (or state) 410, a decision step (or state) 412, a step (or state) 414, a step (or state) 416, and a step (or state) 418.

The step 402 may start the method 400. In the step 404, the exploit detection module 100 may receive the processor instructions. In an example, the data flow command detection module 102 may receive the signal INST. Next, in the step 406, the data flow command detection module 102 may analyze the processor instructions in order to detect data flow instructions in the processor instructions. In the step 408, the data flow command detection module 102 may trim out the data flow instructions from the processor instructions. The data flow instructions in the signal TRIM may be presented to the execution flow detection module 104. In the step 410, the execution flow detection module 104 may compare the data flow instruction in the signal TRIM to a pre-defined pattern for exploit behavior. Next, the method 400 may move to the decision step 412.

In the decision step 412, the execution flow detection module 104 may determine whether the pre-defined exploit behavior has been detected. In an example, the execution flow detection module 104 may analyze the data flow instructions and/or track returns to physical locations in the memory 32 indicated by the data flow instructions. If the pre-defined exploit behavior has not been detected, then the method 400 may move to the step 414. In the step 414, the exploit detection module 100 may generate a notification in the signal EXPT that indicates that no exploit has been detected. Next, the method 400 may move to the step 418. In the decision step 412, if the pre-defined exploit behavior has not been detected, then the method 400 may move to the step 416. In the step 416, the exploit detection module 100 may generate a notification in the signal EXPT that indicates that an exploit has been detected. The processor 30 may react accordingly to the indication of an exploit (e.g., power down, stop executing instructions, alert an end-user, etc.). Next, the method 400 may move to the step 418. The step 418 may end the method 400.

Figure 10:
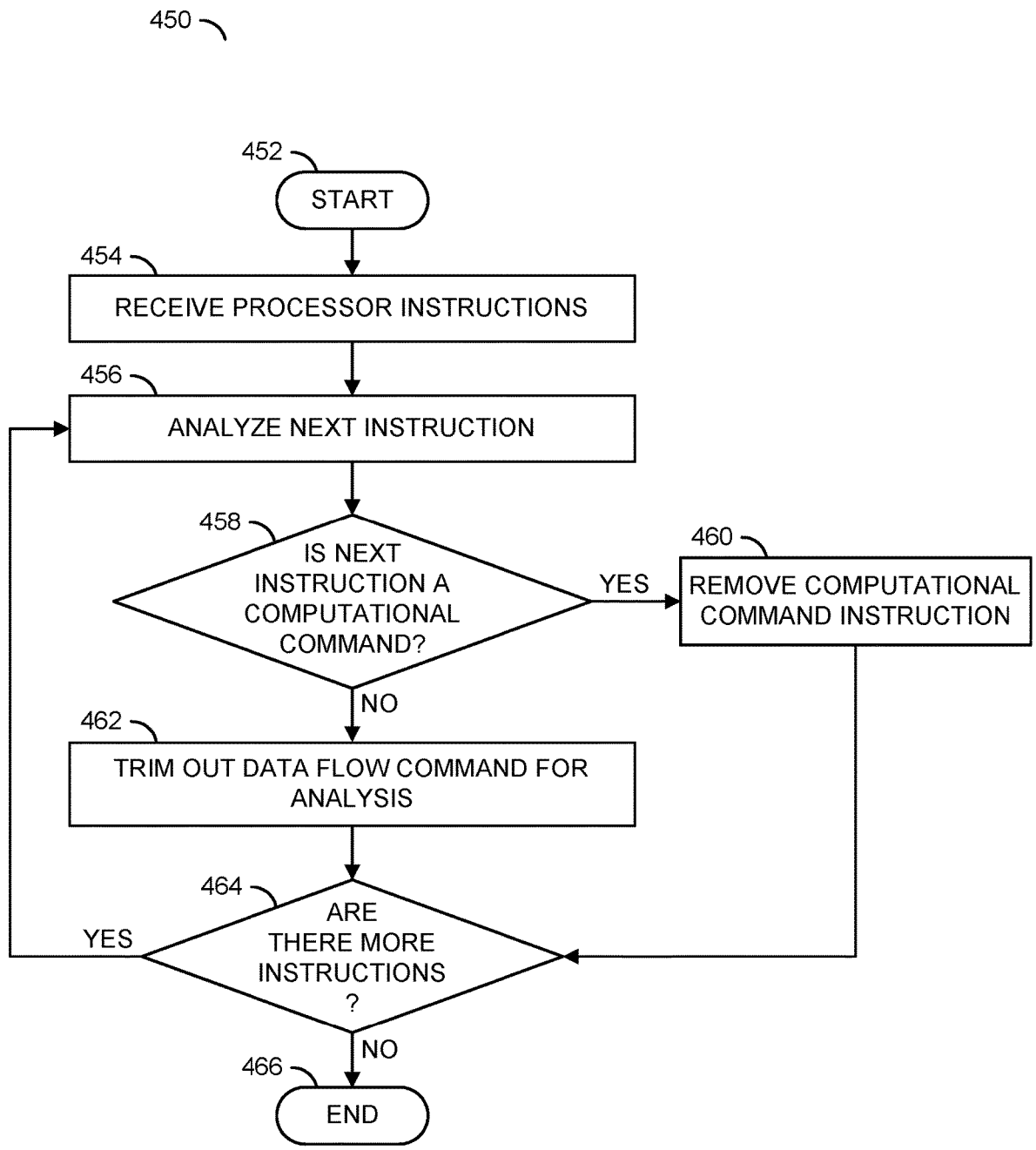
FIG. 10 is a flow diagram illustrating a method for trimming out data flow commands from processor instructions.

Referring to FIG. 10, a method (or process) 450 is shown. The method 450 may trim out data flow commands from processor instructions. The method 450 generally comprises a step (or state) 452, a step (or state) 454, a step (or state) 456, a decision step (or state) 458, a step (or state) 460, a step (or state) 462, a decision step (or state) 464, and a step (or state) 466.

The step 452 may start the method 450. In the step 454, the data flow command detection module 102 may receive the processor instructions. Next, in the step 456, the data flow command detection module 102 may analyze a next instruction provided by the signal INST. Next, the method 450 may move to the decision step 458.

In the decision step 458, the data flow command detection module 102 may determine whether the next instruction is a computational command. For example, a computational command may perform an operation without affecting which instruction may be performed next. If the next instruction is a computational command, then the method 450 may move to the step 460. In the step 460, the data flow command detection module 102 may remove the computational command instruction. Next, the method 450 may move to the decision step 464.

In the decision step 458, if the next instruction is not a computational command, then the method 450 may move to the step 462. In the step 462, the data flow command detection module 102 may trim out the data flow command for analysis by the execution flow detection module 104 (e.g., to be communicated as part of the signal TRIM). Next, the method 450 may move to the decision step 464.

In the decision step 464, the data flow command detection module 102 may determine whether there are more instructions provided in the signal INST. In some embodiments, the processor instructions may continually flow through the exploit detection module 100. In some embodiments, a limited group of instructions may be provided to the exploit detection module 100 for analysis. If there are more processor instructions, then the method 450 may return to the step 456. If there are no more of the processor instructions, then the method 450 may move to the step 466. The step 466 may end the method 450.

In the example of the method 450, the steps 456-464 may describe the analysis of the processor instructions sequentially. In some embodiments, the analysis of the processor instructions may be analyzed in parallel or substantially in parallel. The method of analyzing each instruction may be varied according to the design criteria of a particular implementation.

Figure 11:
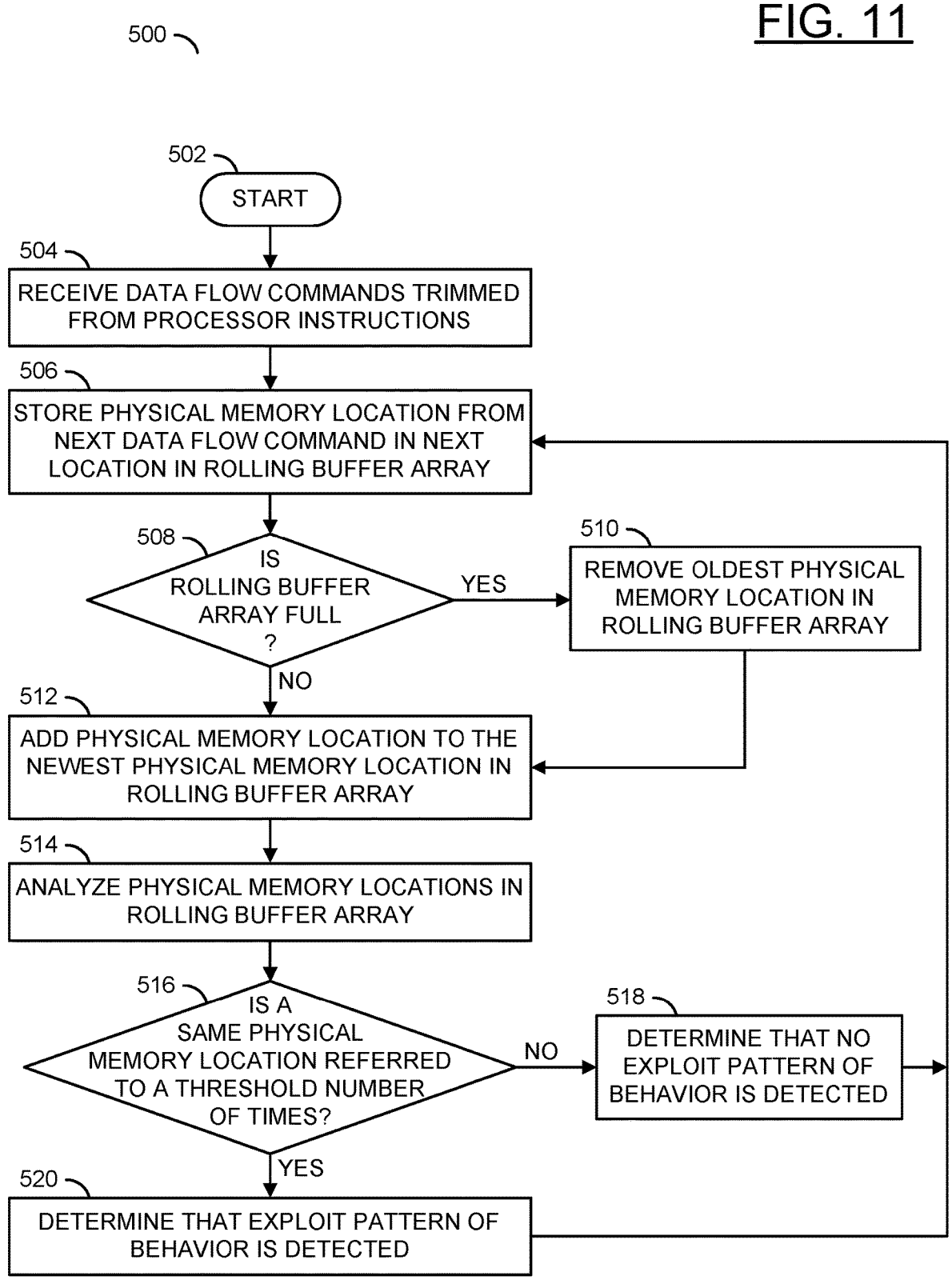
FIG. 11 is a flow diagram illustrating a method for tracking physical memory locations in data flow commands in order to detect an exploit pattern of behavior.

Referring to FIG. 11, a method (or process) 500 is shown. The method 500 may track physical memory locations in data flow commands in order to detect an exploit pattern of behavior. The method 500 generally comprises a step (or state) 502, a step (or state) 504, a step (or state) 506, a decision step (or state) 508, a step (or state) 510, a step (or state) 512, a step (or state) 514, a decision step (or state) 516, a step (or state) 518, and a step (or state) 520.

The step 502 may start the method 500. In the step 504, the execution flow detection module 104 may receive the trimmed commands from the processor instructions. In an example, the data flow command detection module 102 may present the signal TRIM to the execution flow detection module 104. Next, in the step 506, the execution flow detection module 104 may store a physical location of the memory 32 from the next data flow command in a next location in the rolling buffer array 354. For example, a first data flow command may be stored in the first location 370a and 372a of the rolling buffer array 354. Next, the method 500 may move to the decision step 508.

In the decision step 508, the execution flow detection module 104 may determine whether the rolling buffer array 354 is full. In one example, the rolling buffer array 354 may store the ten most recent physical memory locations (e.g., the trimmed instructions 370a-370m). Generally, the rolling buffer array 354 may be full after being initially filled. If the rolling buffer array 354 is full, then the method 500 may move to the step 510. In the step 510, the execution flow detection module 104 may remove an oldest physical memory location from the rolling buffer array 354. For example, the rolling buffer array 354 may be a shift register that drops the oldest physical memory location as a new physical memory location is added. Next, the method 500 may move to the step 512. In the decision step 508, if the rolling buffer array 354 is not full, then the method 500 may move to the step 512.

In the step 512, the execution flow detection module 104 may add the physical memory location of the next instruction to the newest physical memory location in the rolling buffer array 354. Next, in the step 514, the execution flow detection module 104 may analyze the physical memory locations 372a-372n stored in the rolling buffer array 354. Next, the method 500 may move to the decision step 516.

In the decision step 516, the execution flow detection module 104 may determine if a same memory location is referred to a threshold number of times. In one example, the threshold number for repeated physical memory locations may be a user-selected variable (e.g., to select a strictness the detection operations). In another example, the threshold number of repeated physical memory locations may be pre-programmed (e.g., a hard-coded value). If the same physical memory location has not been referred to for the threshold number of times, then the method 500 may move to the step 518. In the step 518, the execution flow detection module 104 may determine that no exploit pattern of behavior has been detected. Next, the method 500 may return to the step 506. In the decision step 516, if the same physical memory location has been referred to for the threshold number of times, then the method 500 may move to the step 520. In the step 520, the execution flow detection module 104 may determine that the exploit pattern of behavior has been detected. Next, the method 500 may return to the step 506.

Referring to FIG. 12, a method (or process) 550 is shown. The method 550 may select local or remote analysis of processor instructions. The method 550 generally comprises a step (or state) 552, a step (or state) 554, a step (or state) 556, a decision step (or state) 558, a step (or state) 560, a decision step (or state) 562, a step (or state) 564, a decision step (or state) 566, a step (or state) 568, a step (or state) 570, and a step (or state) 572.

The step 552 may start the method 550. In the step 554, the processor 30 may generate the processor instructions. In some embodiments, a trace or a debug mode of operation may be selected for exporting the processor instructions to the exploit detection module 100. Next, in the step 556, the processor 30 may determine a communications capability of the device 22. Next, the method 550 may move to the decision step 558.

In the decision step 558, the processor 30 may determine whether the device 22 is capable of communicating with external devices (e.g., the network 154). For example, local (or dumb) devices may not be capable of communicating to the remote location 156. If the device 22 is not capable of communicating to external devices, then the method 550 may move to the step 570. If the device 22 is capable of communicating to external devices, then the method 550 may move to the step 560.

In the step 560, the processor 30 may determine a type of the device 22. Next, the method 550 may move to the decision step 562. In the decision step 562, the processor 30 may determine whether a device class of the device 22 matches a type of device that local processing is suitable for. In an example, various device classes for which local processing may be suitable may comprise satellites, airplanes, ships at sea, devices used in the home (e.g., TVs, appliances, etc.), etc. In another example, various device classes for which remote processing may be suitable may comprise routers, switches, data center hardware, industrial control systems (ICS), supervisory control and data acquisition (SCADA) systems, etc. If the device class of the system 22 does match a type of device for which local processing is preferred, then the method 550 may move to the step 570. If the device class of the system 22 does not match a type of device for which local processing is preferred, then the method 550 may move to the step 564. In the step 564, the processor 30 may determine a subscription status for the device 22. In some embodiments, the exploit detection may be offered as a subscription service. Next, the method 550 may move to the decision step 566.

In the decision step 566, the processor 30 may determine whether the user has a subscription service. In an example, the processor 30 may query the exploit detection module 100 at the remote location 156 to determine if the device 22 is authorized to access the services provided by the exploit detection module 100. In some embodiments, the exploit detection module 100 may offered tiered services (e.g., exploit detection on a high priority to a highest service tier and lower priority exploit detection on a lower service tier). If the user does have a subscription service, then the method 550 may move to the step 568. In the step 568, the system 22 may communicate the processor instructions (e.g., the signal INST) to the remote location 156 for external exploit detection by the exploit detection module 100. Next, the method 550 may move to the step 572. In the decision step 566, if the user does not have a subscription service, then the method 550 may move to the step 570. In the step 570, the exploit detection may be performed locally by the exploit detection module 100 implemented in the system 22. Next, the method 550 may move to the step 572. The step 572 may end the method 550.

The various factors checked in the decision step 558, the decision step 562 and the decision step 566 may be representative examples of factors that may be used to determine whether exploit detection may be performed locally or externally. Not all of the factors may be checked in real time. In some embodiments, the processor 30 may be preprogrammed to provide the processor instructions to a local implementation of the exploit detection module 100 or to the remote location 156 based on the factors described in the method 550.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICS (application specific integrated circuits), Platform ASICs, FPGAs (field programmable gate arrays), PLDs (programmable logic devices), CPLDs (complex programmable logic devices), sea-of-gates, RFICS (radio frequency integrated circuits), ASSPS (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMS (erasable programmable ROMS), EEPROMS (electrically erasable programmable ROMS), UVPROMS (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A method for detecting an exploit in a processing instruction, comprising the steps of:
   receiving processor instructions;
   analyzing said processor instructions to detect data flow instructions;
   trimming out said data flow instructions;
   comparing said data flow instructions to a pre-defined pattern for exploit behavior; and
   generating an exploit notification in response to detecting said pre-defined pattern for exploit behavior in said data flow instructions, wherein
   (i) trimming out said data flow instructions comprises removing computational commands and keeping (a) interrupt commands and (b) execution control flow commands, and
   (ii) a number of said data flow instructions are stored in a rolling buffer to enable detecting said pre-defined pattern for exploit behavior.

2. The method according to claim 1, wherein said pre-defined pattern for exploit behavior comprises a change to said data flow instructions at a level of a processor that results in a new code path added by an exploit.

3. The method according to claim 2, wherein said new code path is detected in response to tracking memory locations for said data flow instructions and determining whether said new code path returns to a specific location in said memory locations.

4. The method according to claim 1, wherein said data flow instructions comprise a creation of one or more instruction branches.

5. The method according to claim 1, further comprising the steps of:
enabling a processor debug feature; and
sending said processor instructions to an external location, wherein said trimming, said comparing and said exploit notification are performed at said external location.

6. The method according to claim 1, further comprising the steps of:
enabling a trace function of a processor; and
sending said processor instructions to an external location, wherein said trimming, said comparing and said exploit notification are performed at said external location.

7. The method according to claim 1, further comprising the steps of:
reading out said processor instructions from a processor instruction buffer; and
sending said processor instructions to an external location, wherein said trimming, said comparing and said exploit notification are performed at said external location.

8. The method according to claim 1, further comprising the steps of:
reading out said processor instructions from a processor instruction buffer; and
writing said processor instructions to a processor buffer, wherein said trimming, said comparing and said exploit notification are performed at said processor buffer.

9. The method according to claim 1, further comprising the steps of:
enabling a trace function of a processor; and
writing said processor instructions to a processor buffer, wherein said trimming, said comparing and said exploit notification are performed at said processor buffer.

10. The method according to claim 1, further comprising the steps of:
enabling a processor debug feature; and
writing said processor instructions to a processor buffer, wherein said trimming, said comparing and said exploit notification are performed at said processor buffer.

11. The method according to claim 1, wherein said exploit behavior comprises changes in a flow of execution at a processor level from one or more of speculative execution exploits, operating system exploits, virtual machine exploits, application exploits, container exploits, real time operating system exploits, virtualized system exploits, code exploits, cloud platform exploits, firmware exploits and software exploits.

12. The method according to claim 1, wherein said steps are performed at one of a BIOS and a UEFI level of said processor instructions.

13. The method according to claim 1, wherein said processor instructions are executable by one or more of an Intel processor, an AMD processor, an ARM processor, a SPARC processor and a RISC-V processor.

14. The method according to claim 1, wherein said steps are implemented by a software security suite.

15. The method according to claim 1, wherein said steps are implemented in a firmware of a processor.

16. The method according to claim 1, wherein said comparing said data flow instructions to said pre-defined pattern for exploit behavior comprises (i) determining whether one of said data flow instructions continually refers back to one of said data flow instructions in said rolling buffer.

17. The method according to claim 1, wherein (i) said data flow instructions comprise a physical memory location and a packet type, (ii) said physical memory location of each of said data flow instructions are stored in a list array and (iii) said list array stores said physical memory location for a most recent ten of said data flow instructions in order to detect said pre-defined pattern for exploit behavior.

18. An apparatus comprising:
an input port configured to receive instructions;
a processor comprising an input buffer for said instructions; and
an exploit detection module configured to (i) receive said instructions from said input buffer, (ii) analyze said instructions to detect data flow instructions, (iii) trim out said data flow instructions, (iv) compare said data flow instructions to a pre-defined pattern for exploit behavior, and (v) generate an exploit notification in response to detecting said pre-defined pattern for exploit behavior in said data flow instructions, wherein
(i) said exploit detection module comprises a rolling buffer,
(ii) trimming out said data flow instructions comprises removing computational commands and keeping (a) interrupt commands and (b) execution control flow commands, and
(iii) a number of said data flow instructions are stored in said rolling buffer to enable detecting said pre-defined pattern for exploit behavior.

19. A method for detecting an exploit in a processing instruction, comprising the steps of:
receiving processor instructions;
analyzing said processor instructions to detect data flow 4 instructions;
trimming out said data flow instructions;
comparing said data flow instructions to a pre-defined pattern for exploit behavior; and
generating an exploit notification in response to detecting said pre-defined pattern for exploit behavior in said data flow instructions, wherein comparing said data flow instructions to said pre-defined pattern for exploit behavior comprises
(i) storing a number of said data flow instructions in a rolling buffer, and
(ii) determining whether one of said data flow instructions continually refers back to one of said data flow instructions in said rolling buffer.

20. The method according to claim 19, wherein trimming out said data flow instructions comprises removing computational commands and keeping (i) interrupt commands and (ii) execution control flow commands.

* * * * *